US009050906B2

(12) United States Patent
Ito et al.

(10) Patent No.: US 9,050,906 B2
(45) Date of Patent: Jun. 9, 2015

(54) ABNORMAL TORQUE EVALUATION APPARATUS FOR ELECTRICALLY DRIVEN VEHICLE

(75) Inventors: Kensuke Ito, Ebina (JP); Yasushi Tomita, Yokohama (JP); Kazuto Koyama, Yokohama (JP); Masato Kondou, Isehara (JP); Yuuki Nakajima, Yokohama (JP); Ikuhiro Taniguchi, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 159 days.

(21) Appl. No.: 13/811,463

(22) PCT Filed: Jul. 15, 2011

(86) PCT No.: PCT/JP2011/066178
§ 371 (c)(1),
(2), (4) Date: Jan. 22, 2013

(87) PCT Pub. No.: WO2012/011437
PCT Pub. Date: Jan. 26, 2012

(65) Prior Publication Data
US 2013/0144479 A1  Jun. 6, 2013

(30) Foreign Application Priority Data
Jul. 23, 2010 (JP) ................... 2010-166205
Jul. 23, 2010 (JP) ................... 2010-166208

(51) Int. Cl.
*B60L 15/36* (2006.01)
*B60L 3/00* (2006.01)
*B60L 3/10* (2006.01)

(52) U.S. Cl.
CPC . *B60L 15/36* (2013.01); *B60L 3/00* (2013.01); *B60L 3/102* (2013.01); *B60L 3/104* (2013.01);
(Continued)

(58) Field of Classification Search
CPC .......... B60L 15/36; B60L 3/00; B60L 3/102; B60L 3/104; B60L 2240/12; B60L 2240/22; B60L 2240/423; B60L 2240/461; B60L 2240/463; Y02T 10/646; Y02T 10/648; Y02T 10/7258
See application file for complete search history.

(56) References Cited

U.S. PATENT DOCUMENTS

| | | | | |
|---|---|---|---|---|
| 6,909,959 | B2 * | 6/2005 | Hallowell | 701/88 |
| 8,401,757 | B2 * | 3/2013 | Tokimasa et al. | 701/70 |
| 8,565,993 | B2 * | 10/2013 | Lu et al. | 701/70 |

FOREIGN PATENT DOCUMENTS

| | | |
|---|---|---|
| JP | 5-319238 A | 12/1993 |
| JP | 2005-168184 A | 6/2005 |

(Continued)

OTHER PUBLICATIONS

Machine Translation of JP 2006-168438, 18 pages.
(Continued)

*Primary Examiner* — John Q Nguyen
*Assistant Examiner* — Alan D Hutchinson
(74) *Attorney, Agent, or Firm* — Foley & Lardner LLP

(57) ABSTRACT

An abnormal torque evaluation apparatus is applied to an electrically driven vehicle configured to drive left and right driving wheels independently with respective electric motors and also configured to independently drive the left and right driving wheels by means of the electric motors driven responsively to respective torque commands. Also provided are a yaw jerk detection means for detecting a yaw jerk and an abnormal torque evaluator for evaluating, based on the yaw jerk, the presence or absence of the occurrence of abnormal motor torque at the electric motors.

16 Claims, 10 Drawing Sheets

(52) U.S. Cl.
CPC ........ *B60L 2240/22* (2013.01); *B60L 2240/423* (2013.01); *Y02T 10/646* (2013.01); *Y02T 10/7258* (2013.01); *Y02T 10/648* (2013.01); *B60L 2240/12* (2013.01); *B60L 2240/461* (2013.01); *B60L 2240/463* (2013.01)

(56) References Cited

FOREIGN PATENT DOCUMENTS

| | | |
|---|---|---|
| JP | 2005-239006 A | 9/2005 |
| JP | 2006-168438 A | 6/2006 |
| JP | 2007-230342 A | 9/2007 |
| JP | 2009-40340 A | 2/2009 |

OTHER PUBLICATIONS

Machine Translation of JP 5-319238, 36 pages.

Japanese Office Action, Mar. 18, 2014, 2 pages.

\* cited by examiner

FIG.4
| YAW-JERK SIGN FLAG | LONGITUDINAL-G SIGN FLAG | ABNORMAL-TORQUE WHEEL EVALUATION VALUE | ABNORMAL-TORQUE WHEEL AND ITS OPERATING STATE |
|---|---|---|---|
| 1 | 1 | 1 | RIGHT-WHEEL POWER RUNNING |
| 0 | 0 | 2 | RIGHT-WHEEL REGENERATION |
| 0 | 1 | 3 | LEFT-WHEEL POWER RUNNING |
| 1 | 0 | 4 | LEFT-WHEEL REGENERATION |
FIG.5
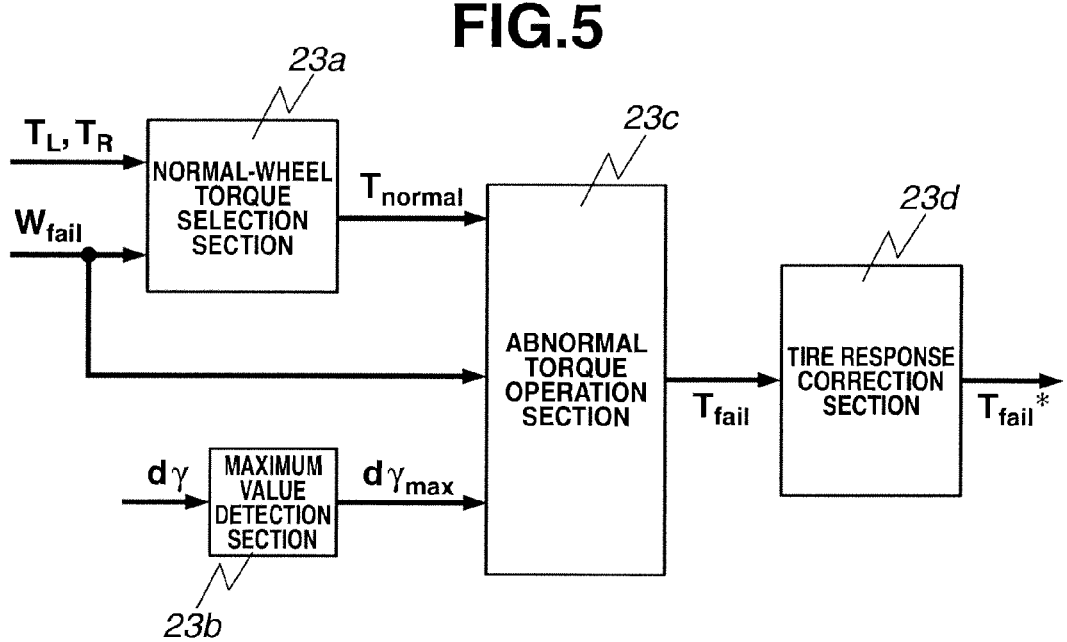
FIG.6
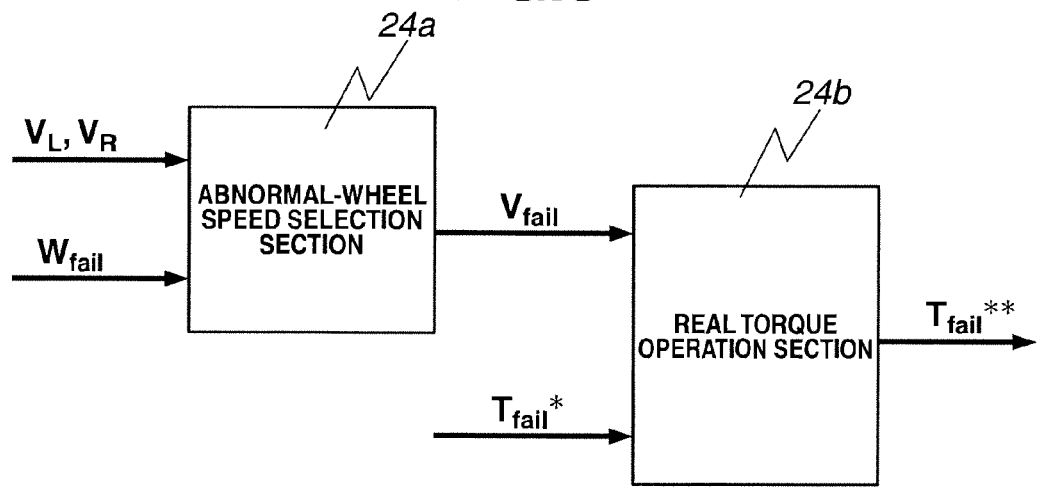

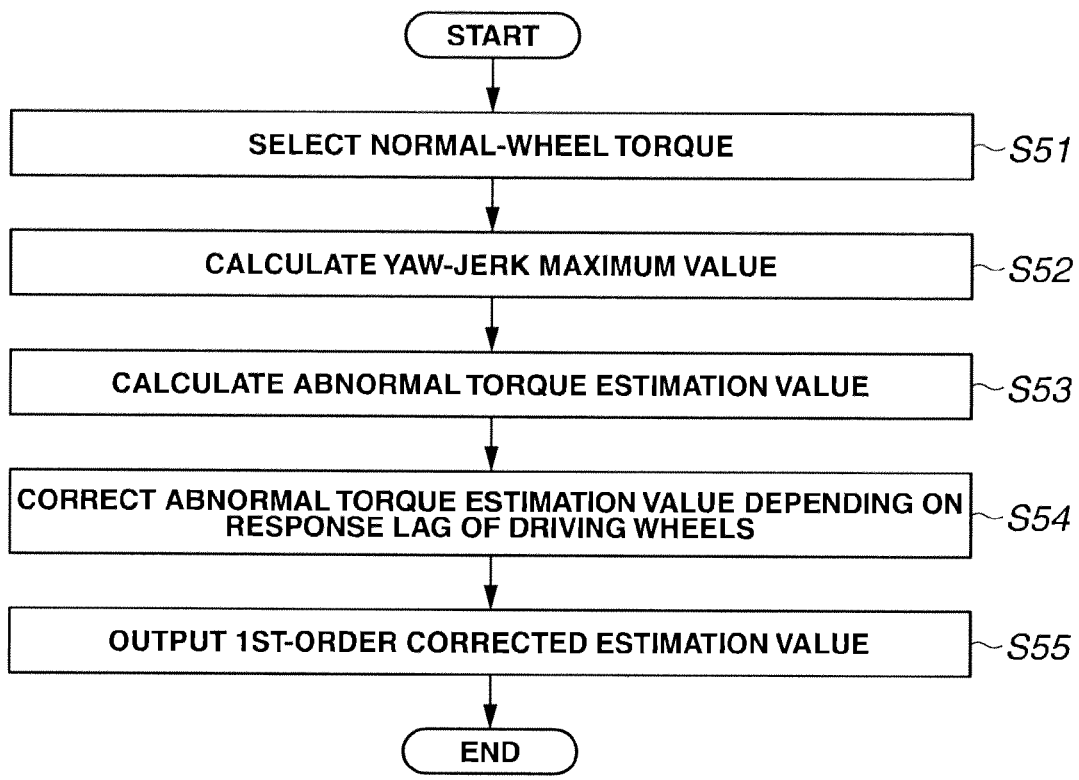
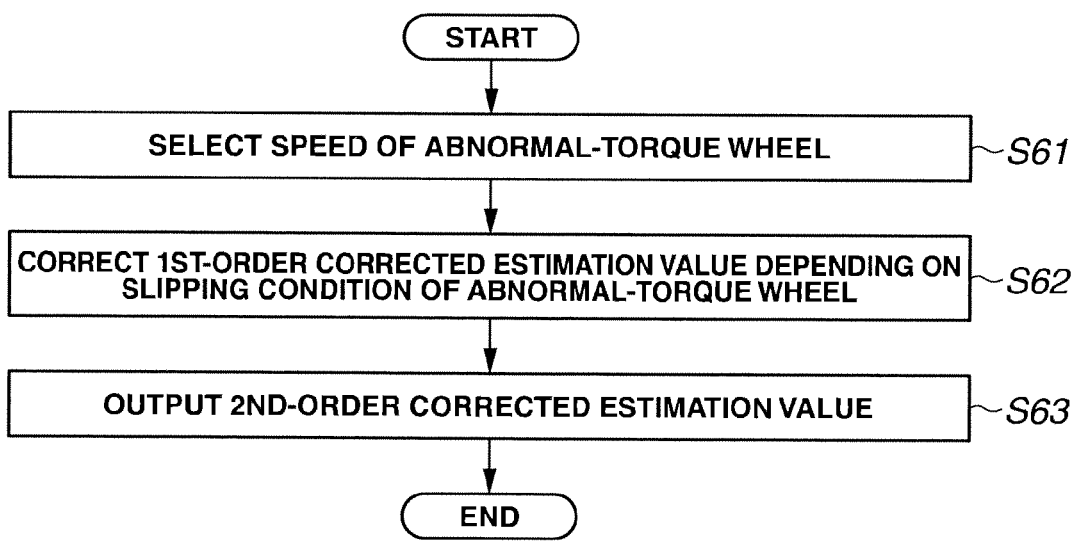

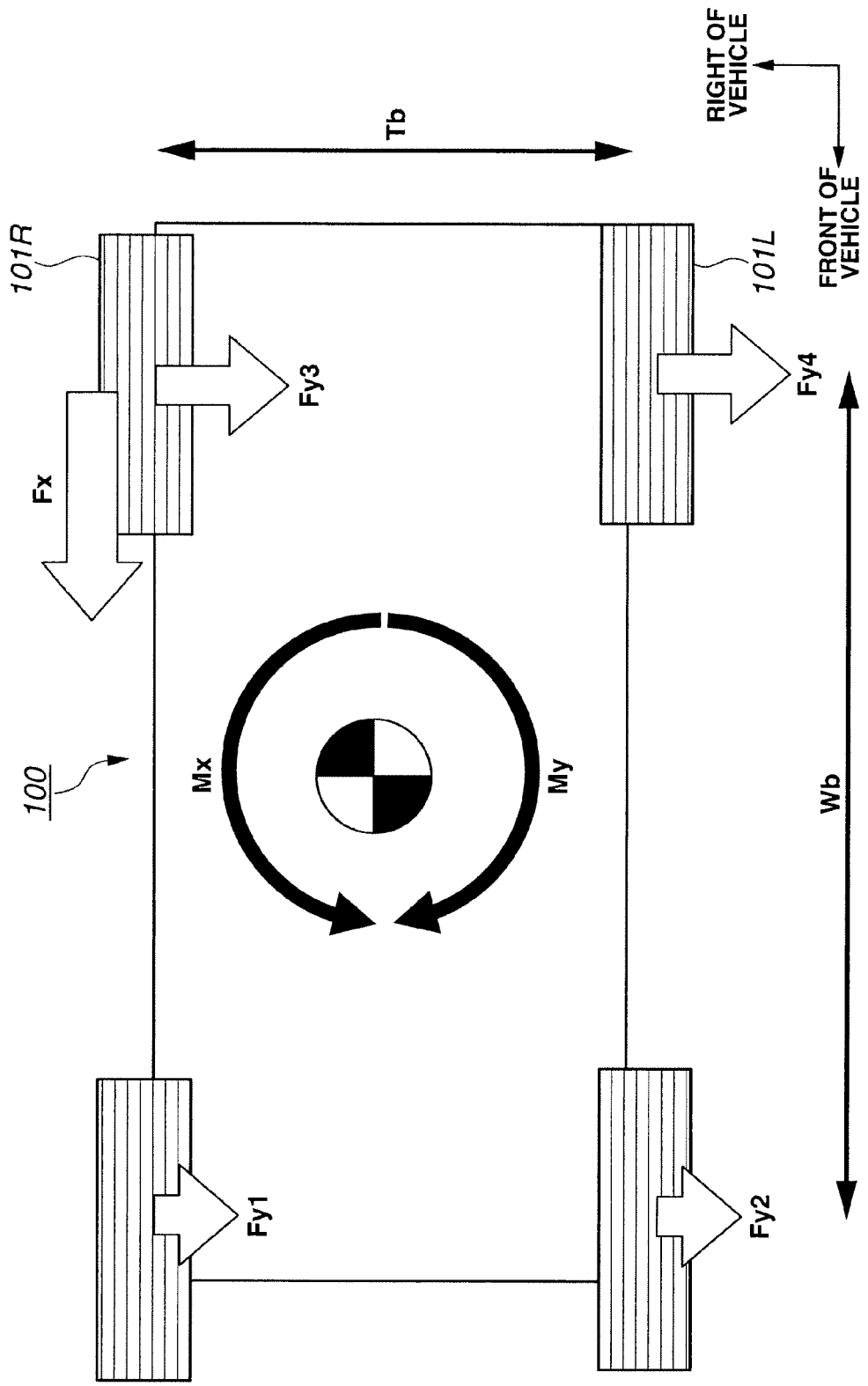

LEFT AND RIGHT DRIVING-WHEEL REAL TORQUES $T_L^{real}$, $T_R^{real}$ [Nm]

$T_R^{real}$ (ABNORMAL)

$T_L^{real}$ (NORMAL)

YAW JERK $d\gamma$ [rad/s²]

$d\gamma_{max}$
$d\gamma_{th}$

LONGITUDINAL-G $a_x$ [G]

ABNORMAL-TORQUE EVALUATION FLAG $F_{fail}$

ABNORMAL-TORQUE WHEEL EVALUATION VALUE $W_{fail}$

ABNORMAL TORQUE ESTIMATION VALUE $T_{fail}$ [N]

YAW RATE $\gamma$ [rad/s]

$t_0$ $t_2$ $t_3$
$t_1$

ABNORMAL TORQUE EVALUATION APPARATUS FOR ELECTRICALLY DRIVEN VEHICLE

TECHNICAL FIELD

The present invention relates to an abnormal torque evaluation apparatus for an electrically driven vehicle for evaluating an abnormality in torque generated at electric motors configured to independently drive left and right driving wheels of at least one of a front road wheel pair and a rear road wheel pair.

BACKGROUND ART

As is generally known, there have been proposed and developed electric motor control devices configured to estimate or derive longitudinal forces of respective driving wheels from a yaw rate of a vehicle, and also configured to estimate, based on the derived longitudinal forces, a current value of electric current being supplied to each of the electric motors, even when an electric motor torque for driving each of the driving wheels becomes undetectable. One such electric motor control device has been disclosed in Patent document 1. In this prior-art electric motor control device, it is possible to evaluate, based on the estimated electric current values, the presence or absence of abnormal motor torque generated at the electric motors.

However, in order to evaluate the presence or absence of the abnormal motor torque on the basis of the longitudinal forces estimated based on the vehicular yaw rate as previously discussed, the device requires a parameter such as a lateral force acting on the vehicle. Generally, the accuracy of modeling of a tire model is not so good, and hence it is difficult to more precisely derive or estimate a parameter such as a lateral force. For the reasons discussed above, in the case of evaluation of the presence or absence of abnormal motor torque, while utilizing a parameter such as a lateral force, there is a problem that the accuracy of evaluation is lowered. In addition to the above, there is a considerable delay time until the occurrence of a lateral force acting on the vehicle, and thus an evaluation time tends to lengthen. Hence, there is a risk of the delay of the correspondence for the poor behavior, such as undesirable torque-down, occurring owing to the occurrence of abnormal motor torque.

It is, therefore, in view of the previously-described drawbacks of the prior art, an object of the invention to provide an abnormal torque evaluation apparatus for an electrically driven vehicle enabling high-precision evaluation of the presence or absence of the occurrence of abnormal motor torque of electric motors that independently drive left and right driving wheels of at least one of a front road wheel pair and a rear road wheel pair, in a short evaluation time.

CITATION LIST

Patent Literature

Patent document 1: Japanese patent provisional publication No. 2005-239006 (A)

SUMMARY OF INVENTION

In order to accomplish the aforementioned and other objects, according to the present invention, an abnormal torque evaluation apparatus is applied to an electrically driven vehicle that independently drives left and right driving wheels of at least one of a front road wheel pair and a rear road wheel pair with electric motors and that drives the electric motors responsively to respective torque commands. The abnormal torque evaluation apparatus for the electrically driven vehicle is provided with a yaw jerk detection means for detecting a yaw jerk corresponding to a yaw acceleration exerted on the electrically driven vehicle, and an abnormal torque evaluation means for evaluating, based on the yaw jerk, whether an abnormal motor torque is being generated at the electric motors.

According to the invention, the presence or absence of the occurrence of abnormal motor torque can be evaluated based on the yaw jerk by the abnormal torque evaluation means. Hence, it is possible to evaluate the presence or absence of abnormal motor torque without using a parameter such as a lateral force, which parameter has the difficulty of high-precision estimation because of the bad accuracy of modeling of a tire model. That is to say, the yaw jerk can be derived from a longitudinal force and a lateral force, both acting on the vehicle, but the influence of the longitudinal force is dominant over all the others immediately after the occurrence of the yaw jerk. This is because the influence of the lateral force takes place at a later time (with a delay time), that is, there is a response difference between the longitudinal force and the lateral force. Therefore, it is possible to suppress the abnormal-motor-torque evaluation from being affected by a parameter such as a lateral force, by virtue of evaluation of the presence or absence of abnormal motor torque, based on the yaw jerk detected in a time domain immediately after the occurrence of the yaw jerk, in which the influence of the longitudinal force is dominant over all the others. As a result of this, it is possible to more precisely evaluate the presence or absence of the occurrence of abnormal motor torque generated at electric motors configured to independently drive left and right driving wheels of at least one of a front road wheel pair and a rear road wheel pair, in a short evaluation time.

BRIEF DESCRIPTION OF DRAWINGS

FIG. 4 is an abnormal wheel evaluation table used for abnormal-torque wheel evaluation processing.

FIG. 5 is a control block diagram illustrating an abnormal torque estimator incorporated in the abnormal torque evaluation apparatus of the first embodiment for the electrically driven vehicle.

FIG. 6 is a control block diagram illustrating a wheel-slip corrector incorporated in the abnormal torque evaluation apparatus of the first embodiment for the electrically driven vehicle.

FIG. 9 is a flowchart illustrating a flow of abnormal torque estimation processing executed within the abnormal torque estimator.

FIG. 10 is a flowchart illustrating a flow of wheel-slip correction processing executed within the wheel-slip corrector.

FIG. 11 is an explanatory view illustrating a vehicle model for explaining the fundamental principle of the abnormal torque evaluation apparatus of the first embodiment for the electrically driven vehicle.

DESCRIPTION OF EMBODIMENTS

The preferred embodiments for the abnormal torque evaluation apparatus for the electrically driven vehicle, made according to the invention, are hereinafter described in reference to the drawings.

First Embodiment

Figure 1:
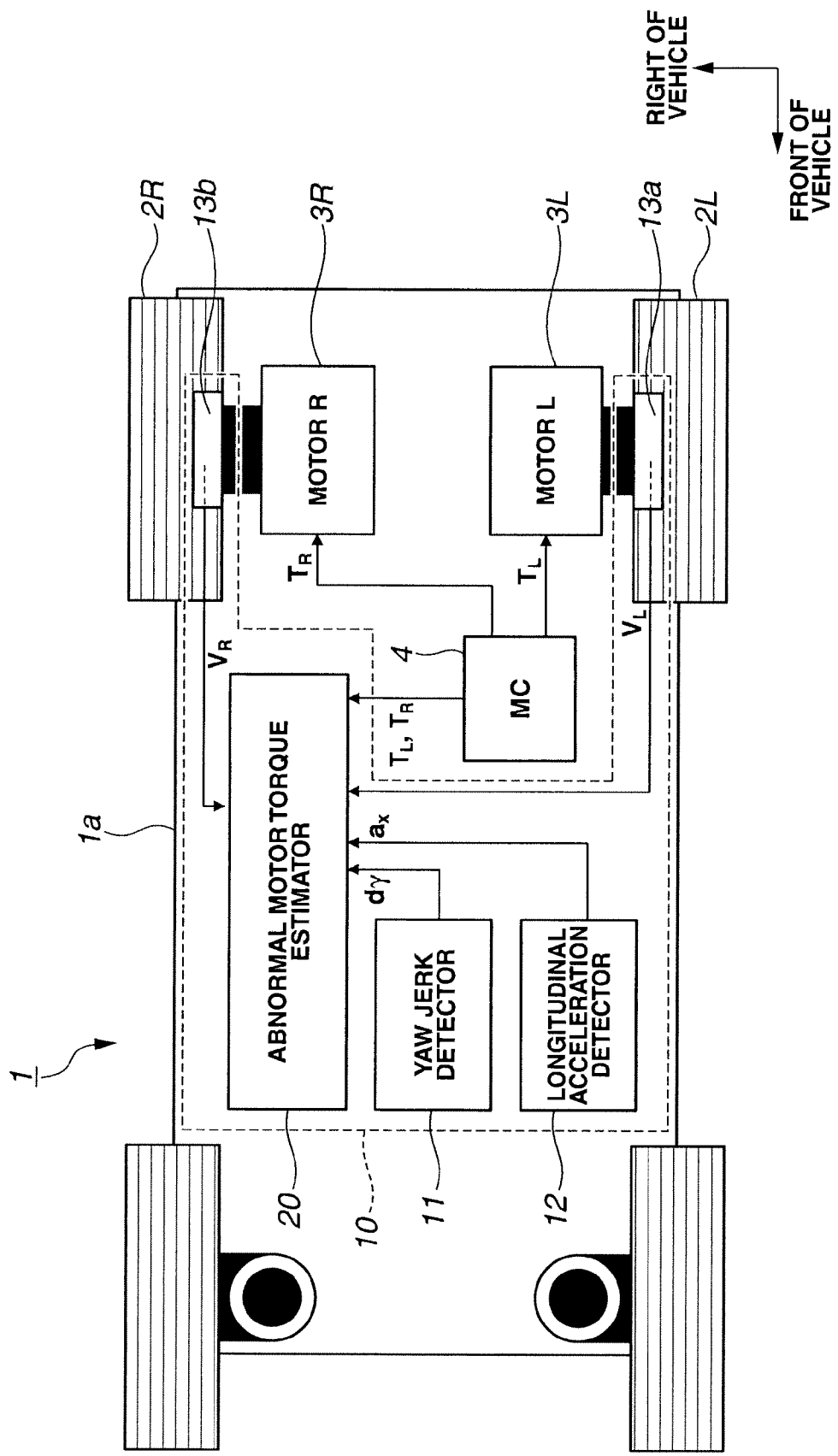
FIG. 1 is a system diagram illustrating an electrically driven vehicle to which a first embodiment of an abnormal torque evaluation apparatus is applied.

First of all, the system configuration is hereunder described. FIG. 1 is the system diagram illustrating an electrically driven vehicle to which the abnormal torque evaluation apparatus of the first embodiment is applied.

As shown in FIG. 1, the electrically driven vehicle 1 of the first embodiment employs a left driving wheel 2L, a right driving wheel 2R, a left drive motor (an electric motor) 3L, a right drive motor (an electric motor) 3R, a motor controller 4, and an abnormal torque evaluation apparatus 10.

The above-mentioned left driving wheel 2L is installed on a vehicle body 1a as a rear-left road wheel, whereas the above-mentioned right driving wheel 2R is installed on the vehicle body 1a as a rear-right road wheel.

The above-mentioned left drive motor 3L is constructed by an in-wheel motor integrally installed in the left driving wheel 2L, whereas the above-mentioned right drive motor 3R is constructed by an in-wheel motor integrally installed in the right driving wheel 2R. The above-mentioned left and right drive motors 3L, 3R are configured to independently drive the respective driving wheels 2L, 2R by electric-current supply from a motor inverter (not shown). By the way, in the shown embodiment, left and right drive motors 3L, 3R also serve as generators that regenerate rotational energies from the respective left and right driving wheels 2L, 2R, so as to recharge a battery (not shown).

The above-mentioned motor controller 4 is provided for controlling driving forces of left and right driving wheels 2L, 2R independently of each other. For instance, motor controller 4 is configured to output appropriate torque commands $T_L$, $T_R$ [Nm] determined based on respective operating conditions of left and right drive motors 3L, 3R and a driver's manipulated variable (a driver's accelerator-pedal actuation amount). The motor inverter (not shown) is configured to supply electric currents, whose current values are determined based on torque commands $T_L$, $T_R$, to respective left and right drive motors 3L, 3R.

That is to say, the previously-described electrically driven vehicle 1 is configured to independently drive left and right driving wheels 2L, 2R, serving as rear-left and rear-right road wheels, by means of left and right drive motors 3L, 3R, which motors are driven responsively to respective torque commands $T_L$, $T_R$ [Nm].

The previously-described abnormal torque evaluation apparatus 10 is mounted on the electrically driven vehicle 1, and provided with a yaw jerk detector (a yaw jerk detection means) 11, a longitudinal acceleration detector (a longitudinal acceleration detection means) 12, a left wheel speed detector 13a (wheel speed detection means), a right wheel speed detector 13b (wheel speed detection means), and an abnormal motor torque estimator 20 (an abnormal motor torque estimation means).

The above-mentioned yaw jerk detector 11 detects a yaw jerk $d\gamma$ [rad/s$^2$] corresponding to a yaw acceleration about the center of gravity of the electrically driven vehicle 1.

The above-mentioned longitudinal acceleration detector 12 detects an acceleration exerted on the electrically driven vehicle 1 in the longitudinal direction (hereinafter referred to as "longitudinal acceleration $a_x$ [G]").

The above-mentioned left wheel speed detector 13a detects a rotational speed of the left driving wheel 2L (hereinafter referred to as "left wheel speed $V_L$ [m/s]"). In a similar manner, the above-mentioned right wheel speed detector 13b detects a rotational speed of the right driving wheel 2R (hereinafter referred to as "right wheel speed $V_R$ [m/s]").

The above-mentioned abnormal motor torque estimator 20 is configured to evaluate the presence or absence of the occurrence of abnormal motor torque of left and right drive motors 3L, 3R, and also configured to estimate an abnormal motor torque value (hereinafter referred to as "abnormal torque estimation value $T_{fail}$ [Nm]") in the presence of the occurrence of abnormal motor torque. Various information, that is, yaw jerk $d\gamma$ [rad/s$^2$] detected by the yaw jerk detector 11, longitudinal acceleration $a_x$ [G] detected by the longitudinal acceleration detector 12, left and right wheel speeds $V_L$, $V_R$ [m/s] respectively detected by left and right wheel speed detectors 13a, 13b, and torque commands $T_L$, $T_R$ generated from the motor controller 4, are inputted into the abnormal motor torque estimator 20.

Figure 2:
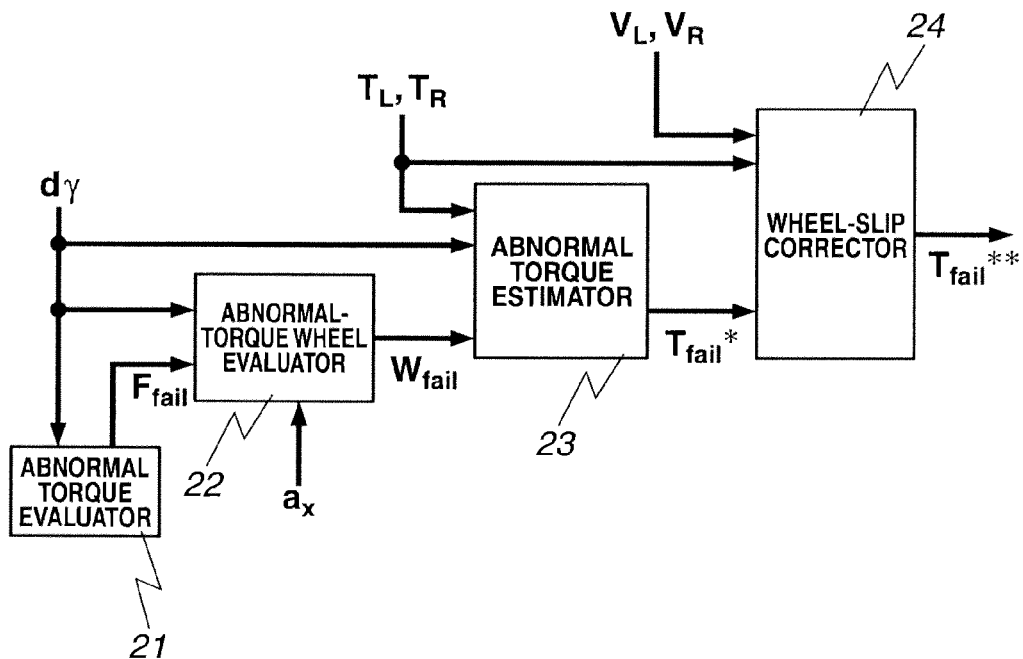
FIG. 2 is a control block diagram illustrating an abnormal motor torque estimator incorporated in the abnormal torque evaluation apparatus of the first embodiment for the electrically driven vehicle.

FIG. 2 is the control block diagram illustrating the abnormal motor torque estimation means incorporated in the abnormal torque evaluation apparatus of the first embodiment for the electrically driven vehicle.

As shown in FIG. 2, the abnormal motor torque estimator 20 has an abnormal torque evaluator (an abnormal torque evaluation means) 21, an abnormal-torque wheel evaluator (an abnormal-torque wheel evaluation means) 22, an abnormal torque estimator 23, and a wheel-slip corrector 24.

The above-mentioned abnormal torque evaluator 21 is configured to evaluate, based on the yaw jerk $d\gamma$ [rad/s$^2$] inputted into the abnormal motor torque estimator 20 and a pre-stored abnormality-evaluation threshold value $d\gamma_{th}$ [rad/s$^2$], the presence or absence of the occurrence of abnormal motor torque, and also configured to output an abnormal-torque evaluation flag $F_{fail}$, given by the following expression (1). By the way, the technical term "abnormal motor torque" means an output torque, which is outputted from the left drive motor 3L and whose torque value does not accord with the torque command $T_L$ [Nm] generated from the motor controller 4, or an output torque, which is outputted from the right drive motor 3R and whose torque value does not accord with the torque command $T_R$ [Nm] generated from the motor controller.

$$F_{fail} = \begin{cases} 0 & (|d\gamma| < d\gamma_{th}) \\ 1 & (|d\gamma| \geq d\gamma_{th}) \end{cases} \quad (1)$$

where $F_{fail}=0$ means a normality, whereas $F_{fail}=1$ means an abnormality. Concretely, when the yaw jerk $d\gamma$ [rad/s$^2$] does not exceed the abnormality-evaluation threshold value $d\gamma_{th}$ [rad/s$^2$], it is determined that any abnormality in motor torque does not occur. Conversely when the yaw jerk $d\gamma$ [rad/s$^2$] exceeds the abnormality-evaluation threshold value $d\gamma_{th}$ [rad/s$^2$], it is determined that an abnormality in motor torque, which torque is used to drive either the left driving wheel 2L or the right driving wheel 2R, occurs. By the way, the abnormality-evaluation threshold value $d\gamma_{th}$ [rad/s$^2$] is set to 0.9 [rad/s$^2$].

The above-mentioned abnormal-torque wheel evaluator 22 is configured to evaluate, based on yaw jerk $d\gamma$ [rad/s$^2$] and longitudinal acceleration $a_x$ [G], both inputted into the abnormal motor torque estimator 20, and abnormal-torque evaluation flag $F_{fail}$ calculated by the abnormal torque evaluator 21, a driving wheel that an abnormality in motor torque has occurred (hereinafter referred to as "abnormal-torque wheel").

The above-mentioned abnormal torque estimator 23 is configured to calculate an abnormal motor torque value $T_{fail}$ of the abnormal-torque wheel, based on yaw jerk $d\gamma$ [rad/s$^2$] and torque commands $T_L$, $T_R$ [Nm], inputted into the abnormal motor torque estimator 20, and an abnormal-torque wheel evaluation value $W_{fail}$ determined by the abnormal-torque wheel evaluator 22. The abnormal torque estimator is further configured to calculate a first-order corrected estimation value by correcting the abnormal motor torque value $T_{fail}$ depending on a response lag in occurrences of longitudinal forces of left and right driving wheels 2L, 2R.

The above-mentioned wheel-slip corrector 24 is configured to correct, based on torque commands $T_L$, $T_R$ [Nm] and left and right wheel speeds $V_L$, $V_R$ [m/s], inputted into the abnormal motor torque estimator 20, the first-order corrected estimation value $T_{fail}*$ calculated by the abnormal torque estimator 23, depending on a slipping condition of the abnormal-torque wheel, so as to output a second-order corrected estimation value $T_{fail}$. By the way, the second-order corrected estimation value $T_{fail}$ becomes a final abnormal motor torque estimation value of the abnormal-torque wheel.

The abnormal-torque wheel evaluator 22, the abnormal torque estimator 23, and the wheel-slip corrector 24 are hereunder described in detail.

Figure 3:
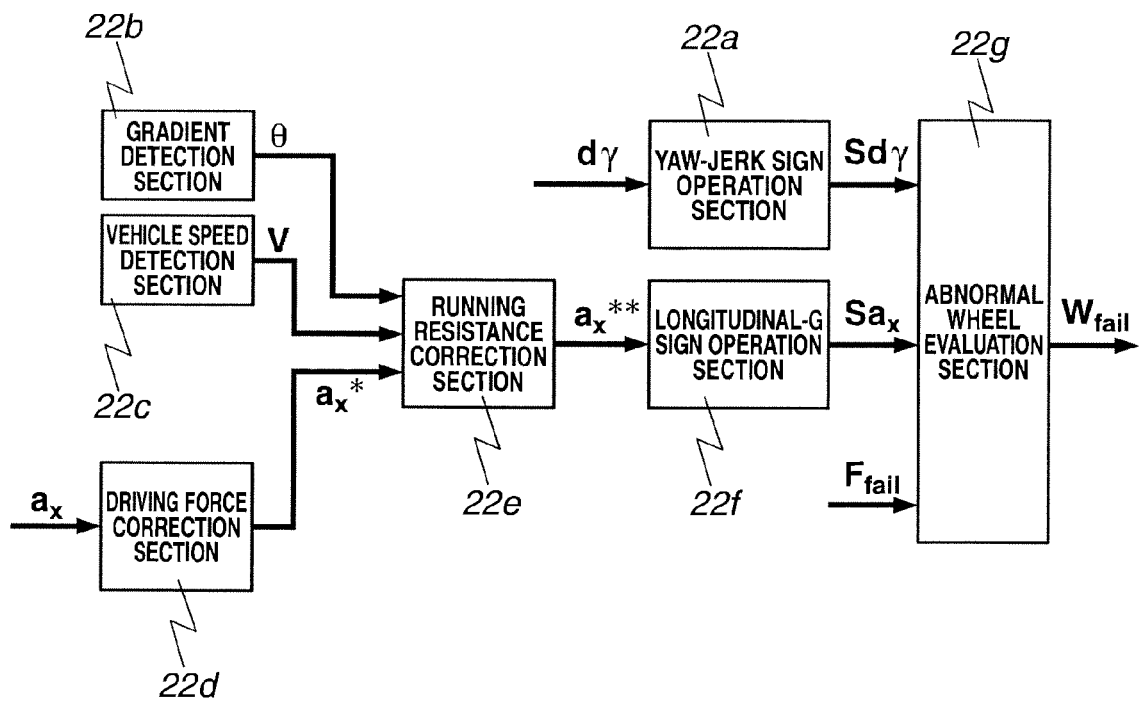
FIG. 3 is a control block diagram illustrating an abnormal-torque wheel evaluator incorporated in the abnormal torque evaluation apparatus of the first embodiment for the electrically driven vehicle.

FIG. 3 is the control block diagram illustrating the abnormal-torque wheel evaluator incorporated in the abnormal torque evaluation apparatus of the first embodiment for the electrically driven vehicle.

As shown in FIG. 3, the abnormal-torque wheel evaluator 22 has a yaw-jerk sign operation section 22a, a gradient detection section 22b, a vehicle speed detection section 22c, a driving force correction section 22d, a running resistance correction section 22e, a longitudinal-acceleration sign operation section 22f, and an abnormal wheel evaluation section 22g.

The above-mentioned yaw-jerk sign operation section 22a is configured to determine the sign of the inputted yaw jerk $d\gamma$ [rad/s$^2$], and also configured to output a yaw-jerk sign flag $Sd\gamma$, given by the following expression (2).

$$Sd\gamma = \begin{cases} 0 & (d\gamma < 0) \\ 1 & (d\gamma \geq 0) \end{cases} \quad (2)$$

where $Sd\gamma=0$, that is, a state where the sign of yaw jerk $d\gamma$ [rad/s$^2$] is a minus sign, indicates a yaw rotation clockwise (rightwards) in FIG. 1, whereas $Sd\gamma=1$, that is, a state where the sign of yaw jerk $d\gamma$ [rad/s$^2$] is a plus sign, indicates a yaw rotation anticlockwise (leftwards) in FIG. 1.

For instance, the above-mentioned gradient detection section 22b is an inclination sensor configured to detect a gradient of the road on which the electrically driven vehicle 1 is running, that is, a longitudinal gradient $\theta$ [rad].

The above-mentioned vehicle speed detection section 22c is configured to calculate, based on left and right wheel speeds $V_L$, $V_R$ [m/s], inputted into the abnormal motor torque estimator 20, a vehicle speed V [m/s], which is a vehicle-body speed of the electrically driven vehicle 1. The vehicle speed V [m/s] is given by the following expression (3).

$$V = \frac{V_L + V_R}{2} \quad (3)$$

The driving force correction section 22d is configured to correct the longitudinal acceleration $a_x$ by removing or subtracting the component of acceleration caused by torque commands $T_L$, $T_R$ [Nm] from the inputted longitudinal acceleration $a_x$ [G], so as to calculate a torque-corrected longitudinal acceleration $a_x*$ [G]. The torque-corrected longitudinal acceleration $a_x*$ [G] is given by the following expression (4).

$$a_x^* = a_x - \frac{(T_L + T_R) \times n}{W \times R} \quad (4)$$

where n denotes a motor reduction ratio, R [unit: m] denotes a tire motion radius, and W [N] denotes a vehicle weight.

The above-mentioned running-resistance correction section 22e is configured to calculate a running resistance D [N] acting on the electrically driven vehicle 1, based on longitudinal gradient $\theta$ [rad] detected by the gradient detection section 22b and vehicle speed V [m/s] calculated by the vehicle speed detection section 22c. The running resistance D [N] is given the following expression (5). The running-resistance correction section 22e is further configured to correct the torque-corrected longitudinal acceleration $a_x*$ calculated by the driving force correction section 22d by removing or subtracting the component of acceleration caused by running resistance D {N} from the torque-corrected longitudinal acceleration $a_x*$ [G], so as to calculate a resistance-corrected longitudinal acceleration $a_x$ [G]. The resistance-corrected longitudinal acceleration $a_x$ [G] is given by the following expression (6)

$$D = \frac{1}{2}\rho C_d A V^2 + W\mu\cos(\theta) + W\sin(\theta) \quad (5)$$

$$a_x^{**} = a_x^* - \frac{D}{W} \quad (6)$$

where $\rho$ [unit: kg/m$^3$] denotes an air density, $C_d$ [−] denotes an air resistance coefficient and is dimensionless, A [m$^2$] denotes a projected area of the front face of the vehicle, and μ [–] denotes a rolling resistance coefficient and is dimensionless.

The above-mentioned longitudinal acceleration sign operation section 22f is configured to determine the sign of the resistance-corrected longitudinal acceleration $a_x^{**}$ [G] corresponding to the twice-corrected longitudinal acceleration further corrected by the running-resistance correction section 22e after having been corrected by the driving force correction section 22d, and also configured to output a longitudinal-acceleration sign flag $Sa_x$, given by the following expression (7).

$$Sa_x = \begin{cases} 0 & (a_x^{} < 0) \\ 1 & (a_x^{} \geq 0) \end{cases} \quad (7)$$

where $Sa_x=0$, that is, a state where the sign of resistance-corrected longitudinal acceleration $a_x^{}$ [G] is a minus sign, indicates an acceleration acting on the vehicle in the forward direction, whereas $Sa_x=1$, that is, a state where the sign of resistance-corrected longitudinal acceleration $a_x^{}$ [G] is a plus sign, indicates an acceleration acting on the vehicle in the backward direction.

The above-mentioned abnormal wheel evaluation section 22g is configured to evaluate an abnormal-torque wheel, based on the yaw-jerk sign flag Sdγ and the longitudinal-acceleration sign flag $Sa_x$, when the inputted abnormal-torque evaluation flag $F_{fail}$ is "1", so as to output an abnormal-torque wheel evaluation value $W_{fail}$. At this time, this abnormal-torque wheel evaluation is done, using the abnormal wheel evaluation table shown in FIG. 4. By the way, in the table, the term "power-running" means a state where the abnormal-torque wheel is driven by means of the drive motor. The term "regeneration" means a state where the abnormal-torque wheel outputs a rotational energy to the drive motor.

FIG. 5 is the control block diagram illustrating the abnormal torque estimator incorporated in the abnormal torque evaluation apparatus of the first embodiment for the electrically driven vehicle.

As shown in FIG. 5, abnormal torque estimator 23 has a normal-wheel torque selection section 23a, a maximum value detection section 23b, an abnormal torque operation section 23c, and a tire response correction section 23d.

The above-mentioned normal-wheel torque selection section 23a is configured to select, based on the abnormal-torque wheel evaluation value $W_{fail}$ generated from the abnormal-torque wheel evaluator 22, a normal-wheel torque $T_{normal}$ [Nm], which torque is used to drive a driving wheel of left and right driving wheels 2L, 2R that is rotating at a normal motor torque, from the torque commands $T_L$, $T_R$ [Nm]. The driving wheel, which is rotating at the normal motor torque, is hereinafter referred to as "normal-torque wheel". The normal-wheel torque $T_{normal}$ [Nm] is given by the following expression (8).

$$T_{normal} = \begin{cases} T_L & (W_{fail} = 1 \text{ or } 2) \\ T_R & (W_{fail} = 3 \text{ or } 4) \end{cases} \quad (8)$$

The above-mentioned maximum value detection section 23b is configured to detect or derive the maximum value (hereinafter referred to as "yaw-jerk maximum value $dγ_{max}$ [rad/s²]") of yaw jerks dγ [rad/s²] detected by the yaw jerk detector 11 from the following expression (9).

$$dγ_{max} = \text{sign}(dγ) \times \max(|dγ|) \quad (9)$$

where the yaw-jerk maximum value $dγ_{max}$ [rad/s²] is calculated as an absolute value of the maximum value of yaw jerks dγ [rad/s²], detected under a state where the abnormal-torque evaluation flag $F_{fail}$ is "1", for a time interval of approximately 0.1 seconds from the time when the occurrence of an abnormality is assumed before the output of this flag.

The above-mentioned abnormal torque operation section 23c is configured to calculate an abnormal torque estimation value $T_{fail}$ [Nm], based on the inputted abnormal-torque wheel evaluation value $W_{fail}$ the normal-wheel torque $T_{normal}$ [Nm] detected by the normal-torque selection section 23a, and the yaw-jerk maximum value $dγ_{max}$ [rad/s²] detected by the maximum value detection section 23h. The abnormal torque estimation value $T_{fail}$ [Nm] is given by the following expression (10).

$$T_{fail} = \begin{cases} dγ_{max} \times \dfrac{R \times 2 \times I}{n \times Tb} + T_{normal} & (W_{fail} = 1 \text{ or } 2) \\ -dγ_{max} \times \dfrac{R \times 2 \times I}{n \times Tb} + T_{normal} & (W_{fail} = 3 \text{ or } 4) \end{cases} \quad (10)$$

where n denotes a motor reduction ratio, R [m] denotes tire motion radius, and W [N] denotes a vehicle weight.

The above-mentioned tire response correction section 23d is configured to correct the abnormal torque estimation value $T_{fail}$ [Nm] calculated by the abnormal torque operation section 23c depending on a response lag in occurrences of longitudinal forces of left and right driving wheels 2L, 2R, so as to calculate a first-order corrected estimation value $T_{fail}^*$ [Nm]. Hereupon, the response characteristic of each of left and right driving wheels 2L, 2R is represented by the transfer characteristic defined by the following expression (11).

$$G_t(s) = \frac{w}{s+w} \quad (11)$$

By the way, in the above-mentioned transfer characteristic, w is approximately equal to 2π×25 [rad/s]. The first-order corrected estimation value $T_{fail}^*$ [Nm] is given by the following expression (12).

$$T_{fail}^* = T_{fail} \times \frac{P(s)}{G_t(s)} \quad (12)$$

where P(s) denotes a filter required for making the expression (12) proper and constructed by a higher-order low-pass filter in comparison with at least the above-mentioned expression (11).

FIG. 6 is the control block diagram illustrating the wheel-slip corrector incorporated in the abnormal torque evaluation apparatus of the first embodiment for the electrically driven vehicle.

As shown in FIG. 6, the above-mentioned wheel-slip corrector 24 has an abnormal-wheel speed selection section 24a and a real torque operation section 24b.

The above-mentioned abnormal-wheel speed selection section 24a is configured to select, based on the abnormal-torque wheel evaluation value $W_{fail}$ generated from the abnormal-torque wheel evaluator 22, an abnormal-wheel speed $V_{fail}$ [m/s] corresponding to a wheel speed of the abnormal-torque wheel, from left and right wheel speeds $V_L$, $V_R$ [m/s].

The abnormal-wheel speed $V_{fail}$ [m/s] is selected by the following expression (13).

$$V_{fail} = \begin{cases} V_R & (W_{fail} = 1 \text{ or } 2) \\ V_L & (W_{fail} = 3 \text{ or } 4) \end{cases} \quad (13)$$

The above-mentioned real torque operation section 24b is configured to correct the first-order corrected estimation value $T_{fail}^*$ [Nm] calculated by the abnormal torque estimator 23, depending on a slipping condition of the abnormal-torque wheel, which slipping condition is derived from the abnormal-wheel speed $V_{fail}$ [m/s] selected by the abnormal-wheel speed selection section 24a, so as to calculate a second-order corrected estimation value $T_{fail}^{}$ [Nm]. The second-order corrected estimation value $T_{fail}^{}$ [Nm] is given by the following expression (14).

$$T_{fail}^{**} = T_{fail}^* + \frac{d}{dt}\left(\frac{V_{fail}}{R}\right) \times I_{wheel} \times \frac{R}{n} \quad (14)$$

where $I_{wheel}$ denotes a rotational inertia of the driving wheel, and d/dt(x) denotes a first-order derivative of x, that is, the time rate of change of x.

Next, the abnormal torque estimation processing executed within the abnormal motor torque estimation means of the abnormal torque evaluation apparatus of the first embodiment is hereunder described in reference to the flowcharts of FIGS. 7-10.

Figure 7:
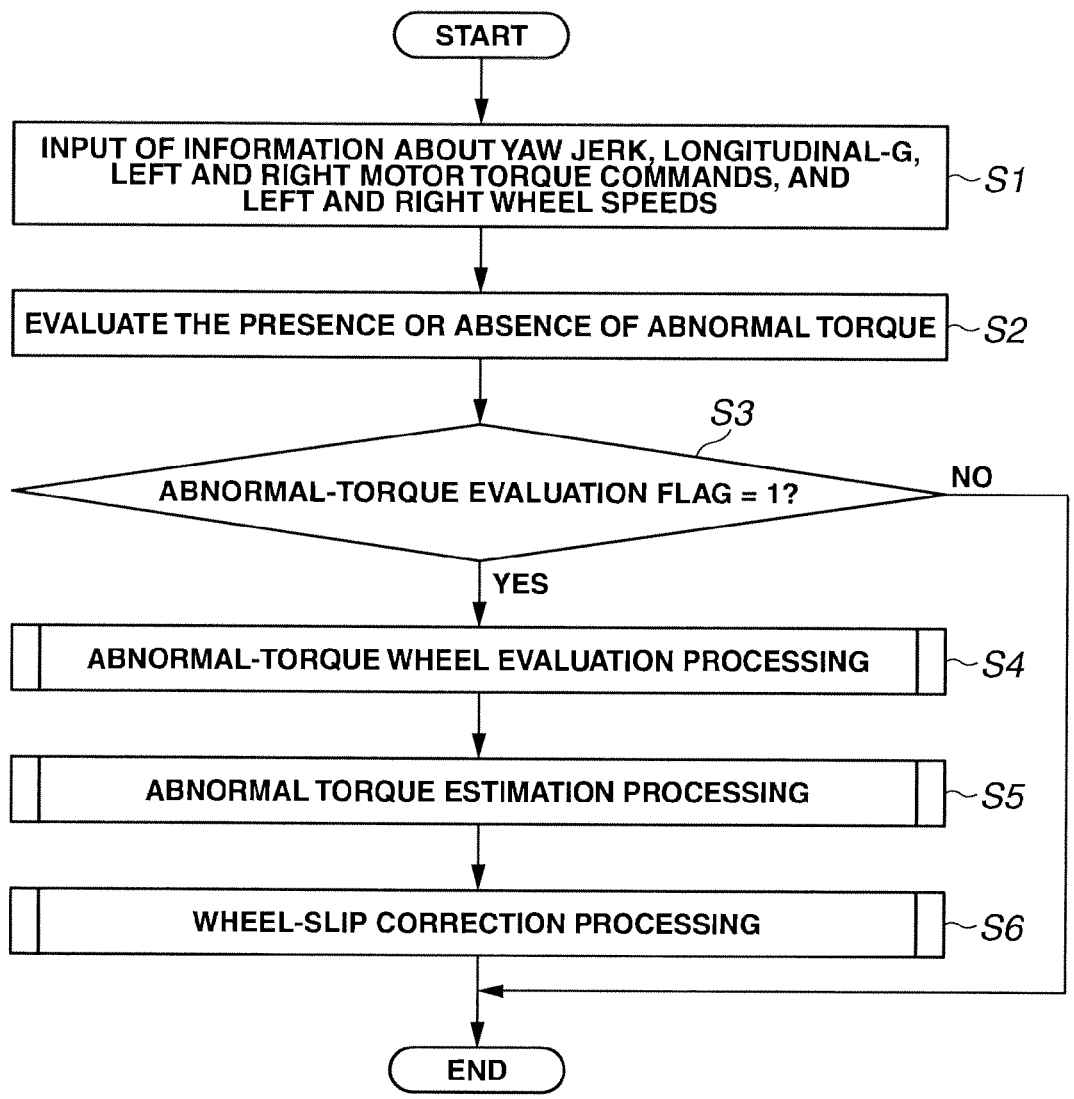
FIG. 7 is a flowchart illustrating a flow of abnormal motor torque estimation processing executed within an abnormal motor torque estimation means.

FIG. 7 is the flowchart illustrating the flow of abnormal motor torque estimation processing executed within the abnormal motor torque estimation means. Respective steps of FIG. 7 are hereunder described in detail.

At step S1, information about yaw jerk dγ [rad/s²] detected by the yaw jerk detector 11, longitudinal acceleration $a_x$ [G] detected by the longitudinal acceleration detector 12, left and right wheel speeds $V_L$, $V_R$ [m/s] respectively detected by left and right wheel speed detectors 13a, 13b, and torque commands $T_L$, $T_R$ [Nm] generated from the motor controller 4, are inputted.

Subsequently to the input of various information of step S1, at step S2, the presence or absence of abnormal motor torque is evaluated based on the yaw jerk dγ [rad/s²] and the abnormality-evaluation threshold value dγ$_{th}$ [rad/s²], and then an abnormal-torque evaluation flag $F_{fail}$ is outputted. Hereupon, the abnormal-torque evaluation flag $F_{fail}$ is given by the previously-discussed expression (1). When the yaw jerk dγ [rad/s²] exceeds the abnormality-evaluation threshold value dγ$_{th}$ [rad/s²], it is determined that an abnormal motor torque occurs. At this time, by setting the abnormality-evaluation threshold value dγ$_{th}$ [rad/s²] to approximately 0.9 [rad/s²], it is possible to eliminate small yaw jerks occurring owing to turning of the vehicle.

At step S3, a check is made to determine whether the abnormal-torque evaluation flag $F_{fail}$, outputted at step S2, is "1". When the answer to this step is in the affirmative (YES), that is, when $F_{fail}$=1 indicating an abnormality, the routine proceeds to step S4. Conversely when the answer to this step is in the negative (NO), that is, when $F_{fail}$=0 indicating a normality, the routine proceeds to "END", to terminate the execution cycle of abnormal motor torque estimation processing.

Subsequently to the decision result of the presence of an abnormality in motor torque, at step S4, abnormal-torque wheel evaluation processing is executed to evaluate an abnormal-torque wheel based on yaw jerk dγ [rad/s²], longitudinal acceleration $a_x$ [G], left and right wheel speeds $V_L$, $V_R$ [m/s], and longitudinal gradient θ [rad], so as to output an abnormal-torque wheel evaluation value $W_{fail}$. Thereafter, the routine proceeds to step S5.

At step S5, abnormal torque estimation processing is executed to calculate a first-order corrected estimation value $T_{fail}^*$ for the abnormal-torque wheel, based on the abnormal-torque wheel evaluation value $W_{fail}$ outputted at step S4, yaw jerk dγ [rad/s²], and torque commands $T_L$, $T_R$ [Nm]. Thereafter, the routine proceeds to step S6.

At step S6, wheel-slip correction processing is executed to correct the first-order corrected estimation value $T_{fail}^*$ calculated at step S5 depending on a slipping condition of the abnormal-torque wheel, so as to calculate a second-order corrected estimation value $T_{fail}^{**}$, and then the routine proceeds to "END", so as to terminate the execution cycle of abnormal torque estimation processing.

Figure 8:
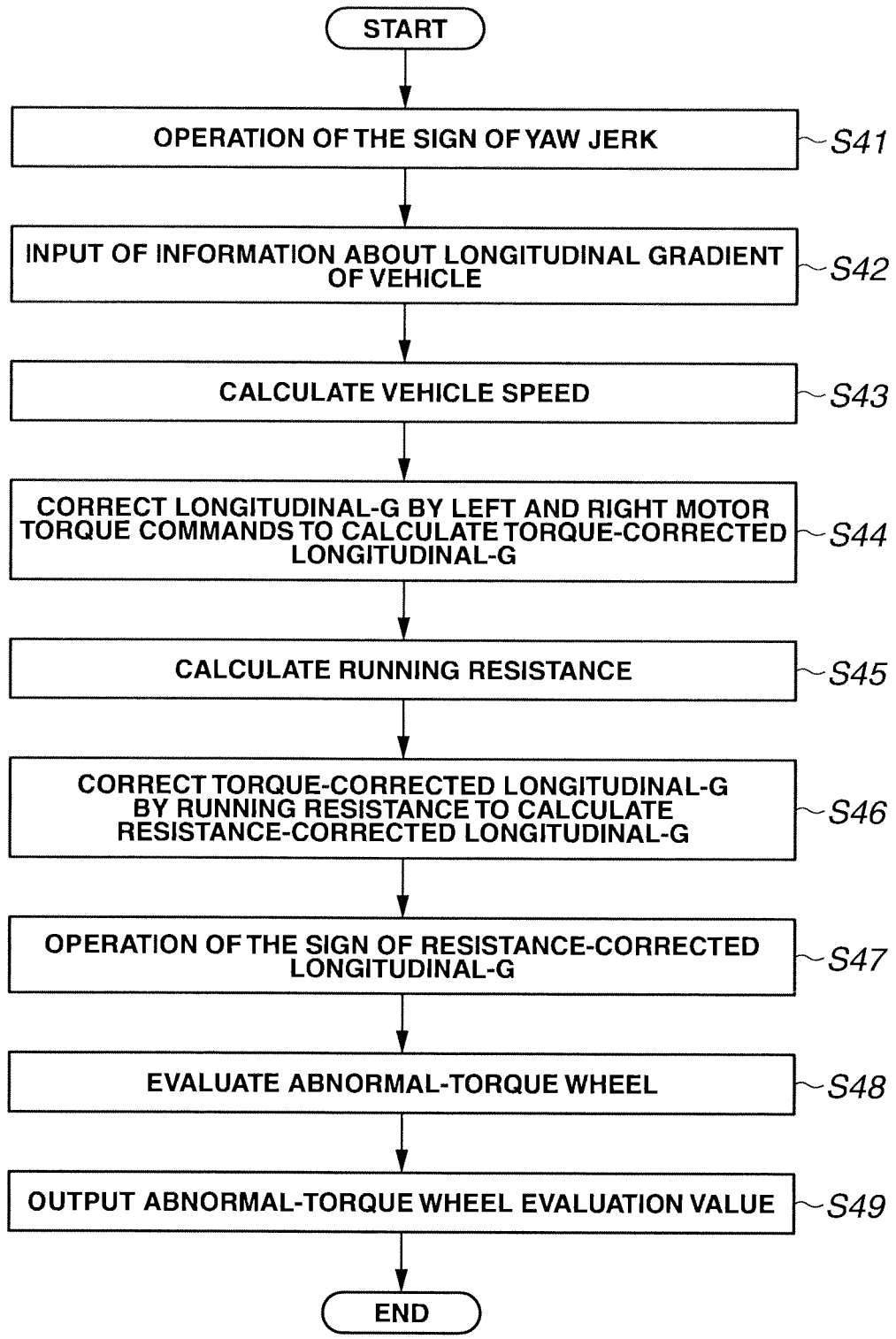
FIG. 8 is a flowchart illustrating a flow of abnormal-torque wheel evaluation processing executed within the abnormal-torque wheel evaluator.

FIG. 8 is the flowchart illustrating the flow of abnormal-torque wheel evaluation processing executed within the abnormal-torque wheel evaluator. Respective steps of FIG. 8 are hereunder described in detail.

At step S41 subsequent to step S3 of FIG. 7, the sign of yaw jerk dγ [rad/s²] inputted at step S1 is determined, and then a yaw-jerk flag Sdγ is outputted. Thereafter, the routine proceeds to step S42. Hereupon, the yaw-jerk sign flag Sdγ is given by the previously-discussed expression (2).

At step S42, information about the longitudinal gradient θ [rad] detected by the gradient detection section 22b is inputted, and then the routine proceeds to step S43.

At step S43, vehicle speed V [m/s] is calculated based on left and right wheel speeds $V_L$, $V_R$ [m/s] inputted at step S1, and then the routine proceeds to step S44. Hereupon, the vehicle speed V [m/s] is given by the previously-discussed expression (3).

At step S44, the longitudinal acceleration $a_x$ is corrected by removing or subtracting the component of acceleration caused by torque commands $T_L$, $T_R$ [Nm] from the longitudinal acceleration $a_x$ [G] inputted at step S1, so as to calculate a torque-corrected longitudinal acceleration $a_x^*$ [G]. Then, the routine proceeds to step S45. Hereupon, the torque-corrected longitudinal acceleration $a_x^*$ [G] is given by the previously-discussed expression (4).

At step S45, running resistance D [N] is calculated based on the longitudinal gradient θ [rad] inputted at step S42 and the vehicle speed V [m/s] calculated at step S43, and then the routine proceeds to step S46. Hereupon, the running resistance D [N] is given by the previously-discussed expression (5).

At step S46, the torque-corrected longitudinal acceleration $a_x^*$ is corrected by removing or subtracting the component of acceleration caused by running resistance D {N} from the torque-corrected longitudinal acceleration $a_x^*$ calculated at step S44, so as to calculate a resistance-corrected longitudinal acceleration $a_x^{}$ [G]. Then, the routine proceeds to step S47. Hereupon, the resistance-corrected longitudinal acceleration $a_x^{}$ [G] is given by the previously-discussed expression (6).

At step S47, the sign of resistance-corrected longitudinal acceleration $a_x^{}$ [G] calculated at step S46 is determined, and then a longitudinal-acceleration sign flag $Sa_x$ is outputted. Thereafter, the routine proceeds to step S48**. Hereupon, the longitudinal-acceleration sign flag $Sa_x$ is given by the previously-discussed expression (7).

At step S48, an abnormal-torque wheel is evaluated based on the yaw-jerk sign flag Sdγ determined at step S41 and the longitudinal-acceleration sign flag $Sa_x$ determined at step S47, and then the routine proceeds to step S49. In doing this abnormal-torque wheel evaluation, the abnormal wheel evaluation table shown in FIG. 4 is used.

At step S49 subsequent to the abnormal-torque wheel evaluation of step S48, an abnormal-torque wheel evaluation value $W_{fail}$ is outputted, and then the execution cycle of abnormal-torque wheel evaluation processing terminates.

FIG. 9 is the flowchart illustrating the flow of abnormal torque estimation processing executed within the abnormal torque estimator. Respective steps of FIG. 9 are hereunder described in detail.

At step S51 subsequent to step S4 of FIG. 7, a normal-wheel torque $T_{normal}$ [Nm], used to drive a normal-torque wheel, is selected, based on the abnormal-torque wheel evaluation value $W_{fail}$ outputted at step S49, from the torque commands $T_L, T_R$ [Nm] inputted at step S1. Thereafter, the routine proceeds to step S52. Hereupon, the normal-wheel torque $T_{normal}$ [Nm] is given by the previously-discussed expression (8).

At step S52, the yaw-jerk maximum value $d\gamma_{max}$ [rad/s$^2$] corresponding to the maximum value of the yaw jerks $d\gamma$ [rad/s$^2$] inputted at step S1, is calculated. Thereafter, the routine proceeds to step S53. Hereupon, the yaw-jerk maximum value $d\gamma_{max}$ [rad/s$^2$] is given by the previously-discussed expression (9).

At step S53, an abnormal torque estimation value $T_{fail}$ [Nm] is calculated based on the abnormal-torque wheel evaluation value $W_{fail}$ outputted at step S49, the normal-wheel torque $T_{normal}$ [Nm] selected at step S51, and the yaw-jerk maximum value $d\gamma_{max}$ [rad/s$^2$] calculated at step S52. Thereafter, the routine proceeds to step S54. Hereupon, the abnormal torque estimation value $T_{fail}$ [Nm] is given by the previously-discussed expression (10).

At step S54, the abnormal torque estimation value $T_{fail}$ [Nm] calculated at step S53 is corrected depending on a response lag in occurrences of longitudinal forces of left and right driving wheels 2L, 2R, so as to calculate a first-order corrected estimation value $T_{fail}^*$ [Nm]. Thereafter, the routine proceeds to step S55. Hereupon, the first-order corrected estimation value $T_{fail}^*$ [Nm] is given by the previously-discussed expression (12).

At step S55 subsequent to arithmetic operation for the first-order corrected estimation value $T_{fail}^*$ [Nm] executed at step S54, the calculated first-order corrected estimation value $T_{fail}^*$ [Nm] is outputted, and then the routine proceeds to "END", so as to terminate the execution cycle of abnormal torque estimation processing.

FIG. 10 is the flowchart illustrating the flow of wheel-slip correction processing executed within the wheel-slip corrector. Respective steps of FIG. 10 are hereunder described in detail.

At step S61 subsequent to step S5 of FIG. 7, an abnormal-wheel speed $V_{fail}$ [m/s] corresponding to a wheel speed of the abnormal-torque wheel, is selected, based on the abnormal-torque wheel evaluation value $W_{fail}$ outputted at step S49, from the left and right wheel speeds $V_L, V_R$ [m/s] inputted at step S1. Thereafter, the routine proceeds to step S62. Hereupon, the abnormal-wheel speed $V_{fall}$ [m/s] is selected by the previously-discussed expression (13).

At step S62, the first-order corrected estimation value $T_{fail}^*$ [Nm] outputted at step S55 is corrected depending on a slipping condition of the abnormal-torque wheel, which slipping condition is derived from the abnormal-wheel speed $V_{fail}$ [m/s] selected at step S61, so as to calculate a second-order corrected estimation value $T_{fail}^{}$ [Nm]. Thereafter, the routine proceeds to step S63. Hereupon, the second-order corrected estimation value $T_{fail}^{}$ [Nm] is given by previously-discussed expression (14).

At step S63 subsequent to arithmetic operation for the second-order corrected estimation value $T_{fail}^{}$ [Nm] executed at step S62, the calculated second-order corrected estimation value $T_{fail}^{}$ [Nm] is outputted, and then the routine proceeds to "END", so as to terminate the execution cycle of wheel-slip correction processing.

Next, the operation is hereunder described. First, the "fundamental principle of the abnormal torque evaluation apparatus of the first embodiment for the electrically driven vehicle" is explained. Subsequently, the "abnormal motor torque estimating action", performed by the abnormal torque evaluation apparatus of the first embodiment for the electrically driven vehicle, is explained.

[Fundamental Principle of Abnormal Torque Evaluation Apparatus of First Embodiment for Electrically Driven Vehicle]

Figure 12A:
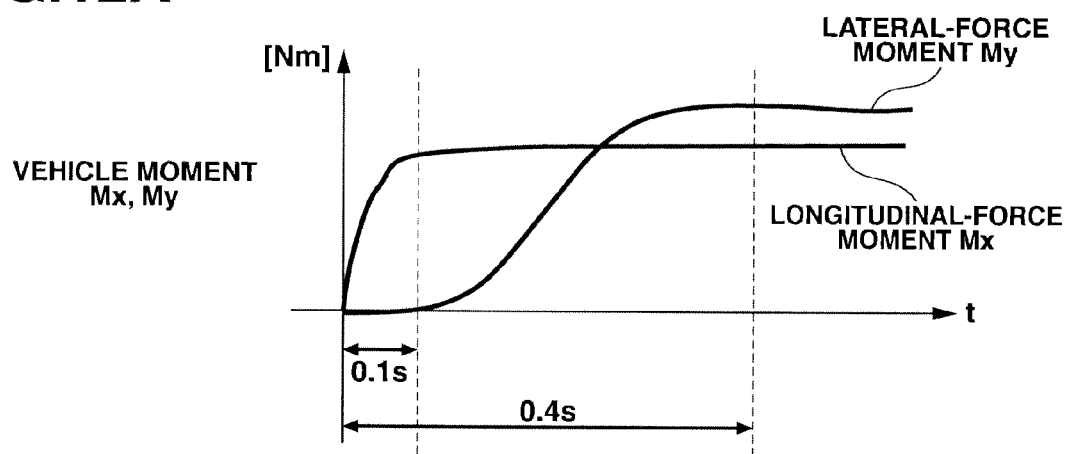
FIGS. 12A-12C are time charts illustrating characteristics of variations of vehicle moments, a yaw jerk, and an abnormal motor torque, respectively obtained during a time period of abnormal-torque evaluation based on the fundamental principle of the abnormal torque evaluation apparatus of the first embodiment for the electrically driven vehicle.
Figure 12B:
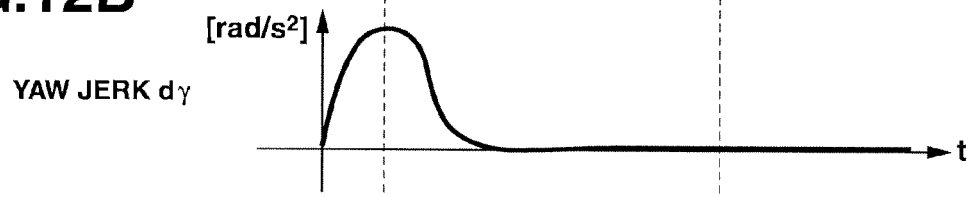
Figure 12C:
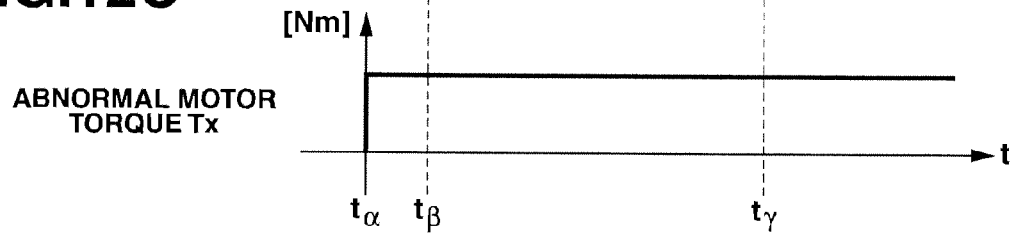
Figure 13A:
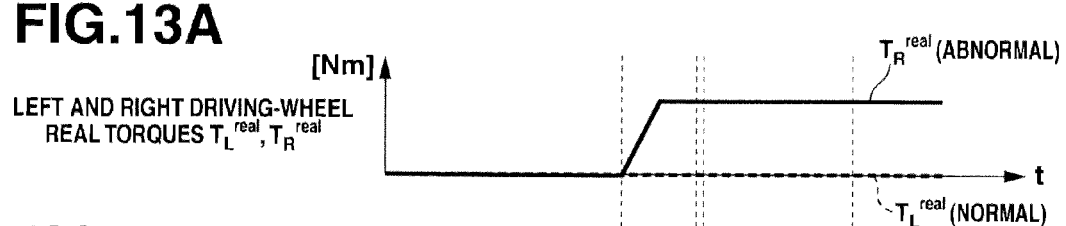
FIGS. 13A-13G are time charts illustrating characteristics of variations of left and right driving-wheel real torques, a yaw jerk, a longitudinal acceleration, an abnormal-torque evaluation flag, an abnormal wheel evaluation value, an abnormal torque estimation value, and a yaw rate, respectively obtained during a time period of abnormal-torque evaluation based on the abnormal motor torque estimation processing of the first embodiment.
Figure 13B:
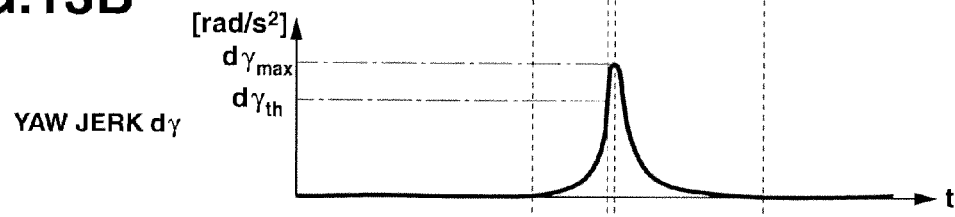
Figure 13C:
Figure 13D:
Figure 13E:
Figure 13F:
Figure 13G:
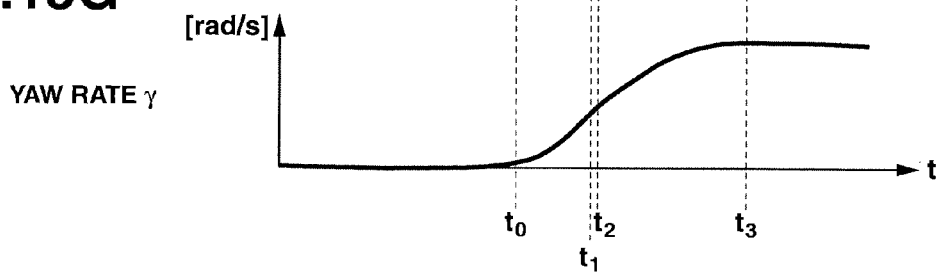

FIG. 11 is the explanatory view illustrating a vehicle model for explaining the fundamental principle of the abnormal torque evaluation apparatus of the first embodiment for the electrically driven vehicle. FIGS. 12A-12C are the time charts illustrating characteristics of variations of vehicle moments, a yaw jerk, and an abnormal motor torque, respectively obtained during a time period of abnormal-torque evaluation based on the fundamental principle of the abnormal torque evaluation apparatus of the first embodiment for the electrically driven vehicle.

Assume that, during running of a vehicle 100 in which rear-left and rear-right road wheels 101L, 101R are set as driving wheels, an electric motor (not shown) configured to drive the rear-right road wheel 101R generates an abnormal motor torque (hereinafter referred to as "abnormal motor torque Tx [Nm]"). By the way, the technical term "abnormal motor torque Tx [Nm]" means an output torque generated from the electric motor, whose torque value does not accord with the torque command of the electric motor.

At this time, owing to the abnormal motor torque Tx [Nm], a longitudinal force Fx [N] acts on the abnormal wheel (in the shown embodiment, the rear-right road wheel 101R). A vehicle moment (hereinafter is referred to as "longitudinal-force moment Mx [Nm]"), resulting from the longitudinal force Fx [N], can be calculated by the following expression (15).

$$Mx = \frac{Tx \times n}{2 \times R} Tb \qquad (15)$$

where Tb [m] denotes a tread base (a track width), n denotes a motor reduction ratio [–] and is dimensionless, R [m] denotes a tire motion radius. The sign, which indicates the direction of rotation of the moment acting anticlockwise, is defined as a plus sign.

At the same time, owing to the abnormal motor torque Tx [Nm], the vehicle 100 tends to slip in the lateral direction, and thus lateral forces Fy1 [N] to Fy4 [N] act on the respective road wheels. A vehicle moment (hereinafter is referred to as "lateral-force moment My [Nm]"), resulting from the lateral forces Fy1 [N] to Fy4 [N], can be calculated by the following expression (16).

$$My = \frac{Fy1 + Fy2 - Fy3 - Fy4}{2} Wb \quad (16)$$

where Wb denotes a wheelbase.

Therefore, yaw jerk dγ [rad/s²] exerted on the vehicle 100 owing to the occurrence of abnormal motor torque Tx [Nm], is determined based on the longitudinal force Fx [N] and the lateral forces Fy1 [N] to Fy4 [N], which forces act on the vehicle, and given by the following expression (17).

$$d\gamma = \frac{Mx}{I} + \frac{My}{I} \quad (17)$$

where I [kgm²] denotes a yawing inertia of the vehicle 100.

By the way, the response frequency of the longitudinal force is approximately 25 Hz. In contrast, the response frequency of the lateral force is approximately 2 Hz. As compared to the longitudinal force, the lateral force tends to occur with a delay time. That is to say, owing to the occurrence of abnormal motor torque Tx [Nm], longitudinal-force moment Mx [Nm], lateral-force moment My [Nm], and yaw jerk dγ [rad/s²], all acting on the vehicle 100, vary as seen in FIGS. 12A-12C.

When abnormal motor torque Tx [Nm] occurs at the time $t_\alpha$ of FIGS. 12A-12C, a longitudinal-force moment Mx [Nm] occurs almost at the same timing as the occurrence of abnormal motor torque Tx [Nm]. Yaw jerk dγ [rad/s²] results from the occurrence of longitudinal-force moment Mx [Nm]. The longitudinal-force moment Mx [Nm] reaches a peak value at the time $t_\beta$, and thereafter changes, while being maintained substantially at the peak value. At this point of time $t_\beta$, yaw jerk dγ [rad/s²] becomes a maximum value. The time interval from the time $t_\alpha$ to this point of time $t_\beta$ is approximately 0.1 seconds. Furthermore, from this point of time, a lateral-force moment My [Nm] gradually begins to develop. The lateral-force moment My [Nm] reaches a peak value at the time $t_\gamma$, and thereafter changes, while being maintained substantially at the peak value. The time interval from the time $t_\alpha$ to this point of time $t_\gamma$ is approximately 0.4 seconds.

As appreciated from the above, the external force acting on the vehicle 100 is dominated by the influence of longitudinal-force moment Mx [Nm] for approximately 0.1 seconds from the occurrence of abnormal motor torque Tx [Nm], whereas the influence of lateral-force moment My [Nm] is negligible. Hence, the maximum value of yaw jerk dγ [rad/s²] can be determined based on the longitudinal-force moment Mx [Nm], as can be seen from the following expression (18), because of My≈0.

$$d\gamma = \frac{Mx}{I} \quad (18)$$

The abnormal motor torque Tx [Nm] immediately after it has occurred can be derived by the following expression (19) from the previously-discussed two expressions (15) and (18).

$$Tx = \frac{Mx \times 2 \times R}{n \times Tb} = \frac{d\gamma \times I \times 2 \times R}{n \times Tb} \quad (19)$$

In the abnormal torque evaluation apparatus of the first embodiment for the electrically driven vehicle, which utilizes the above-mentioned fundamental principle, the presence or absence of the occurrence of abnormal motor torque Tx [Nm] is evaluated based on the yaw jerk dγ [rad/s²] detected in a time domain immediately after the occurrence of yaw jerk dγ [rad/s²], in which the influence of the longitudinal force is dominant over all the others. Hence, it is possible to evaluate the occurrence of abnormal motor torque, while suppressing the influence of a parameter such as a lateral force, thus enabling a high accuracy of evaluation. Also, the evaluation is done by the use of the yaw jerk dγ [rad/s²] generated in a time domain that the external force acting on the vehicle is dominated by the longitudinal force having a response time faster than the lateral force, thus enabling the evaluation time to be shortened. Estimating abnormal motor torque Tx [Nm] by the use of yaw jerk dγ [rad/s²] eliminates the necessity of using a parameter such as a lateral force. This enables high-precision evaluation. Additionally, the evaluation is done by the use of the yaw jerk dγ [rad/s²] having a faster time response, it is possible to shorten the evaluation time.

[Abnormal Torque Evaluating Action]

FIGS. 13A-13G are the time charts illustrating characteristics of variations of left and right driving-wheel real torques, a yaw jerk, a longitudinal acceleration, an abnormal-torque evaluation flag, an abnormal wheel evaluation value, an abnormal torque estimation value, and a yaw rate, respectively obtained during a time period of abnormal-torque evaluation based on the abnormal motor torque estimation processing of the first embodiment.

During running of the electrically driven vehicle 1 to which the abnormal torque evaluation apparatus of the first embodiment is applied, the routine proceeds from step S1 to step S2 in the flowchart shown in FIG. 7, so as to acquire necessary input information and to evaluate the presence or absence of the occurrence of abnormal motor torque.

At the time $t_0$, assume that an abnormality in motor torque, which torque is used to drive the right driving wheel 2R, has occurred, and thus a real torque $T_R^{real}$ of right driving wheel 2R indicates an abnormal value. On the other hand, a real torque $T_L^{real}$ of left driving wheel 2L that an abnormality motor torque does not occur, changes as a normal value. At this time, a yaw jerk dγ [rad/s²] and a yaw rate γ [rad/s] begin to develop.

At the time $t_1$ when the yaw jerk dγ [rad/s²] exceeds the abnormality-evaluation threshold value $d\gamma_{th}$ [rad/s²], abnormal-torque evaluation flag $F_{fail}$ becomes "1", and hence the answer to step S3 of the flowchart of FIG. 7 becomes affirmative (YES). Thus, the routine proceeds to step S4.

By the way, the time interval from the time $t_0$ to the time $t_1$ is generally determined based on both the response time of yaw jerk dγ [rad/s²] and abnormality-evaluation threshold value $d\gamma_{th}$ [rad/s²], and hence the time interval can be set to approximately 0.1 seconds. At this time, in contrast, yaw rate γ [rad/s] slightly occurs to such an extent that it is insufficient to evaluate the presence or absence of the occurrence of abnormal motor torque.

Also, in the case of evaluation of the presence or absence of the occurrence of abnormal motor torque based on yaw rate γ [rad/s], such an evaluation has to be delayed until the time $t_3$ when the output of yaw rate γ [rad/s] becomes stable. The time interval from the time $t_0$ to the time $t_3$ corresponds to the response time of yaw rate γ [rad/s], whose response time is approximately 0.4 seconds.

The reason for this response difference is that, as previously discussed, the response frequency of a longitudinal force acting on the driving wheel is approximately 25 Hz, whereas the response frequency of a lateral force is approximately 2 Hz. Hence, in a time domain immediately after the occurrence of yaw jerk dγ [rad/s²], in which the influence of the longitudinal force having a faster response time is dominant over all the others, that is, during the time interval of approximately 0.1 seconds, the evaluation can be done by the yaw jerk dγ [rad/s$^2$] generated in this domain. However, the evaluation based on yaw rate γ [rad/s] requires a lateral force that tends to occur with a time delay.

In this manner, by evaluating the presence or absence of the occurrence of abnormal motor torque, based on the yaw jerk dγ [rad/s$^2$] detected in a time domain immediately after the occurrence of yaw jerk dγ [rad/s$^2$], in which the influence of the longitudinal force is dominant over all the others, it is possible to suppress the influence of a parameter such as a lateral force, thereby enabling high-precision evaluation of the presence or absence of an abnormality. That is, it is possible to more precisely evaluate the presence or absence of an abnormality without needing a parameter having the difficulty of high-precision estimation because of the bad accuracy of modeling of a tire model, thus enhancing the accuracy of evaluation. Additionally, evaluation of the presence or absence of the occurrence of abnormal motor torque based on the yaw jerk dγ [rad/s$^2$] generated in a time domain immediately after the occurrence of the yaw jerk, in which the influence of a longitudinal force is dominant over all the others, is superior in shortened evaluation time, rather than that based on yaw rate γ [rad/s] that requires a lateral force having a later response time.

Furthermore, in the abnormal torque evaluation apparatus of the first embodiment for the electrically driven vehicle, when the yaw jerk dγ [rad/s$^2$] exceeds the abnormality-evaluation threshold value dγ$_{th}$ [rad/s$^2$], it is determined that an abnormal motor torque occurs. Hence, it is possible to reduce the probability of an erroneous decision which may occur owing to a disturbance during the usual turning behavior, thus enhancing the accuracy of evaluation.

Also, in the abnormal torque evaluation apparatus of the first embodiment for the electrically driven vehicle, immediately when longitudinal acceleration a$_x$ [G] occurs at the time t$_1$, step S41 in the flowchart of FIG. 8 is executed to determine the sign of yaw jerk dγ [rad/s$^2$]. Thereafter, the routine proceeds from step S42 through step S43 to step S44, to correct the longitudinal acceleration a$_x$ by the torque commands T$_L$, T$_R$ [Nm]. Thereafter, the routine proceeds from step S45 through step S46 to step S47, for further correcting the longitudinal acceleration a$_x$ [G] corrected by torque commands T$_L$, T$_R$ [Nm] (that is, the torque-corrected longitudinal acceleration a$_x$* [G]) by the running resistance D [N], and for determining the sign of the resistance-corrected longitudinal acceleration.

In this manner, by correcting the longitudinal acceleration a$_x$ [G] by the torque commands T$_L$, T$_R$ [Nm], it is possible to evaluate an abnormal wheel, while removing the influence of torque commands T$_L$, T$_R$ [Nm], thus enhancing the accuracy of evaluation. Additionally, in the abnormal torque evaluation apparatus of the first embodiment, the running resistance D [N] of the electrically driven vehicle 1 is calculated based on the longitudinal gradient θ [rad] and the vehicle speed V [m/s]. The longitudinal acceleration a$_x$ [G] (exactly, the torque-corrected longitudinal acceleration a$_x$* [G] corrected by torque commands T$_L$, T$_R$ [Nm]) is further corrected based on the result of calculation for the running resistance. Hence, a change in longitudinal acceleration a$_x$ [G], occurring owing to the running resistance D [N] can be sufficiently taken into account. Thus, it is possible to specify an abnormal-torque wheel regardless of the running resistance D [N]. As a result of this, it is possible to further enhance the accuracy of evaluation of the presence or absence of the occurrence of abnormal motor torque.

Thereafter, the routine proceeds through step S48 to step S49, for evaluating an abnormal-torque wheel based on the sign of yaw jerk dγ [rad/s$^2$] and the sign of the twice-corrected longitudinal acceleration (that is, the resistance-corrected longitudinal acceleration a$_x$** [G]), and for outputting an abnormal-torque wheel evaluation value W$_{fail}$. In the shown embodiment, the right driving wheel 2R, which is in the power-running state, corresponds to the abnormal-torque wheel, and thus the abnormal-torque wheel evaluation value W$_{fail}$ becomes "1". At this time, step S51 in the flowchart of FIG. 9 is executed to select a normal-wheel torque T$_{normal}$ [Nm].

In this manner, by evaluating the abnormal-torque wheel based on the longitudinal acceleration a$_x$ [G] and the yaw jerk dγ [rad/s$^2$], it is possible to precisely specify the abnormal-torque wheel, thus enabling the presence or absence of the occurrence of abnormal motor torque to be more precisely evaluated.

At the time t$_2$ when the yaw jerk dγ [rad/s$^2$] shows a maximum value, in the flowchart shown in FIG. 9 the routine proceeds through step S52 to step S53 for detecting the yaw-jerk maximum value dγ$_{max}$ [rad/s$^2$], and for calculating the abnormal torque estimation value T$_{fail}$ [Nm].

The time interval from the time t$_0$ to the time t$_2$ is generally determined based on the response time of yaw jerk dγ [rad/s$^2$], and hence the time interval can be detected as approximately 0.1 seconds. In contrast, in the case of evaluation of abnormal torque estimation value T$_{fail}$ [Nm] based on yaw rate γ [rad/s], the timing, at which the evaluation starts, has to be delayed until the time t$_3$. The time interval from the time t$_0$ to the time t$_3$ corresponds to the response time of yaw rate γ [rad/], whose response time is approximately 0.4 seconds.

The reason for this response difference is that, as previously discussed, the response frequency of a longitudinal force acting on the driving wheel is approximately 25 Hz, whereas the response frequency of a lateral force acting on the vehicle is approximately 2 Hz. Hence, the yaw jerk dγ [rad/s$^2$] can be determined based on the vehicle moment generated in a time domain, in which the influence of a longitudinal force is dominant over all the others, in other words, during the time interval of approximately 0.1 seconds.

In this manner, estimating the abnormal torque estimation value T$_{fail}$ [Nm] by the use of yaw jerk dγ [rad/s$^2$] generated in a time domain that the influence of a longitudinal force is dominant over all the others, enables high-precision estimation of abnormal torque estimation value T$_{fail}$ [Nm] without using a parameter such as a lateral force. That is, it is possible to estimate the abnormal torque estimation value T$_{fail}$ [Nm] without needing a parameter having the difficulty of high-precision estimation because of the bad accuracy of modeling of a tire model, thus enhancing the accuracy of estimation. Additionally, the previously-discussed yaw-jerk based estimation is superior in shortened estimation time, rather than estimation of abnormal torque estimation value T$_{fail}$ [Nm] based on yaw rate γ [rad/s].

Additionally, in the abnormal torque evaluation apparatus of the first embodiment for the electrically driven vehicle, when estimating abnormal motor torque value T$_{fail}$ [Nm], the yaw-jerk maximum value dγ$_{max}$ [rad/s$^2$] is used. Hence, a signal-to-noise ratio of yaw jerk dγ [rad/s$^2$] can be enhanced, and whereby the accuracy of detection of yaw jerk dγ [rad/s$^2$] can be enhanced and consequently the accuracy of estimation of abnormal torque estimation value T$_{fail}$ [Nm] can be further enhanced.

In the abnormal torque evaluation apparatus of the first embodiment for the electrically driven vehicle, after the abnormal torque estimation value T$_{fail}$ [Nm] has been calculated at step S53 in the flowchart of FIG. 9, the routine proceeds through step S54 to step S55, for correcting the abnormal torque estimation value $T_{fail}$ [Nm] depending on a response lag in occurrences of longitudinal forces of left and right driving wheels 2L, 2R, and for outputting the first-order corrected estimation value $T_{fail}$* [Nm].

In this manner, by correcting the abnormal torque estimation value $T_{fail}$ [Nm] depending on a response lag in occurrences of longitudinal forces of left and right driving wheels 2L, 2R, it is possible to estimate the abnormal motor torque value, sufficiently taking account of the influence of a response lag in occurrences of longitudinal forces of left and right driving wheels 2L, 2R. Thus, it is possible to further enhance the accuracy of estimation of the abnormal motor torque value.

Furthermore, in the abnormal torque evaluation apparatus of the first embodiment for the electrically driven vehicle, after having outputted the first-order corrected estimation value $T_{fail}$* [Nm], step S61 in the flowchart of FIG. 10 is executed to select a wheel speed of the abnormal-torque wheel. Thereafter, the routine proceeds through step S62 to step S63, for correcting the first-order corrected estimation value $T_{fail}$* [Nm] depending on a slipping condition of the abnormal-torque wheel, which slipping condition is derived from the abnormal-wheel speed $V_{fail}$ [m/s], and for outputting the second-order corrected estimation value $T_{fail}$ [Nm]. Hence, in the abnormal torque evaluation apparatus of the first embodiment for the electrically driven vehicle, the finally-outputted second-order corrected estimation value $T_{fail}$ becomes a final abnormal motor torque estimation value.

In this manner, by correcting the first-order corrected estimation value $T_{fail}$* [Nm] depending on a slipping condition of the abnormal-torque wheel, a change in the driving force transmitted to the ground surface, which driving-force change occurs due to a wheel slip of the abnormal-torque wheel, can be sufficiently taken into account. Thus, it is possible to further enhance the accuracy of estimation of the abnormal motor torque value.

Details of the effects are hereunder described. The abnormal torque evaluation apparatus of the first embodiment for the electrically driven vehicle can provide the following effects.

(1) In an electrically driven vehicle 1 that independently drives left and right driving wheels 2L, 2R with electric motors (left and right drive motors) 3L, 3R and that drives the electric motors 3L, 3R responsively to respective torque commands $T_L$, $T_R$ [Nm], a yaw jerk detection means (a yaw jerk detector) 11 for detecting a yaw jerk dγ [rad/s²] corresponding to a yaw acceleration exerted on the electrically driven vehicle 1, and an abnormal torque evaluation means (an abnormal torque evaluator) 21 for evaluating whether an abnormal motor torque is being generated at the electric motors 3L, 3R. The abnormal torque evaluation means 21 is configured to evaluate, based on the yaw jerk dγ, whether the abnormal motor torque is being generated at the electric motors 3L, 3R. This enables high-precision evaluation of presence or absence of the occurrence of abnormal motor torque of the electric motors that independently drive the left and right driving wheels of at least one of a front road wheel pair and a rear road wheel pair, in a short evaluation time.

(2) The above-mentioned abnormal torque evaluation means 21 is configured to evaluate that the abnormal motor torque is being generated, when the yaw jerk dγ exceeds a threshold value (an abnormality-evaluation threshold value) $dγ_{th}$. Hence, it is possible to reduce the probability of an erroneous decision which may occur owing to a disturbance, thus enhancing the accuracy of evaluation.

(3) Also provided are a longitudinal acceleration detection means (a longitudinal acceleration detector) 12 for detecting a longitudinal acceleration $a_x$, which is an acceleration exerted on the electrically driven vehicle 1 in a longitudinal direction, and an abnormal-torque wheel evaluation means (an abnormal-torque wheel evaluator) 22 for evaluating an abnormal-torque wheel driven by the abnormal motor torque. The abnormal-torque wheel evaluation means 22 is configured to evaluate, based on the longitudinal acceleration $a_x$ and the yaw jerk dγ, the abnormal-torque wheel. Hence, it is possible to specify the abnormal-torque wheel, thus further enhancing the accuracy of evaluation of the presence or absence of the occurrence of abnormal motor torque.

(4) The above-mentioned abnormal-torque wheel evaluation means 22 includes a gradient detection section 22b for detecting a gradient θ of a road, on which the electrically driven vehicle 1 is running, a vehicle speed detection section 22c for detecting a vehicle-body speed V of the electrically driven vehicle 1, and a running-resistance correction section 22e for calculating, based on the gradient θ and the vehicle-body speed V, a running resistance D acting on the electrically driven vehicle 1, and for correcting the longitudinal acceleration $a_x$ by the running resistance D. Hence, a change in the longitudinal acceleration, which change occurs due to the running resistance D, can be sufficiently taken into account, and therefore it is possible to evaluate the abnormal-torque wheel, regardless of the running resistance, thus further enhancing the accuracy of evaluation of the presence or absence of the occurrence of abnormal motor torque.

(5) Further provided is an abnormal motor torque estimation means (an abnormal motor torque estimator) 20 for estimating an abnormal motor torque value (an abnormal torque estimation value) $T_{fail}$ [Nm] of the electric motors 3L, 3R. The abnormal motor torque estimation means 20 includes an abnormal-torque wheel evaluator 22 for evaluating an abnormal-torque wheel driven at the abnormal motor torque value $T_{fail}$ [Nm], and an abnormal torque estimator 23 for estimating the abnormal motor torque value $T_{fail}$ [Nm] based on the yaw jerk dγ [rad/s²], an abnormal-torque wheel evaluation value $W_{fail}$ determined by the abnormal-torque wheel evaluator, and the torque commands $T_L$, $T_R$ [Nm]. This enables high-precision estimation of the abnormal motor torque value of abnormal motor torque generated at the electric motors configured to independently drive the left and right driving wheels of at least one of the front road wheel pair and the rear road wheel pair, in a short evaluation time.

(6) The above-mentioned abnormal torque estimator 23 is configured to use a yaw-jerk maximum value $dγ_{max}$ [rad/s²], when estimating the abnormal motor torque value $T_{fail}$ [Nm]. Hence, a signal-to-noise ratio of yaw jerk dγ [rad/s²] can be enhanced, and whereby the accuracy of detection of yaw jerk dγ [rad/s²] can be enhanced and consequently the accuracy of estimation can be further enhanced.

(7) The above-mentioned abnormal torque estimator 23 includes a tire response correction section 23d for correcting the abnormal motor torque value $T_{fail}$ [Nm] depending on a response lag in occurrences of longitudinal forces of the driving wheels 2L, 2R. Hence, the influence of a response lag in occurrences of longitudinal forces of driving wheels 2L, 2R can be sufficiently taken into account, thus further enhancing the accuracy of estimation.

(8) Further provided are wheel speed detection means (left and right wheel speed detectors) 13a, 13b for detecting respective wheel speeds (left and right wheel speeds) $V_L$, $V_R$ of the driving wheels 2L, 2R. The abnormal motor torque estimation means 20 includes a wheel-slip corrector 24 for correcting the abnormal motor torque value depending on a slipping condition of the abnormal-torque wheel, which slipping condition is derived from the wheel speeds $V_L$, $V_R$. Hence, the influence of a wheel slip of the abnormal-torque wheel can be sufficiently taken into account, and thus it is possible to further enhance the accuracy of estimation.

Second Embodiment

The abnormal torque evaluation apparatus of the second embodiment for the electrically driven vehicle is exemplified as an apparatus configured to evaluate the presence or absence of the occurrence of abnormal torque depending on the presence or absence of an abnormality in a brake.

Figure 14:
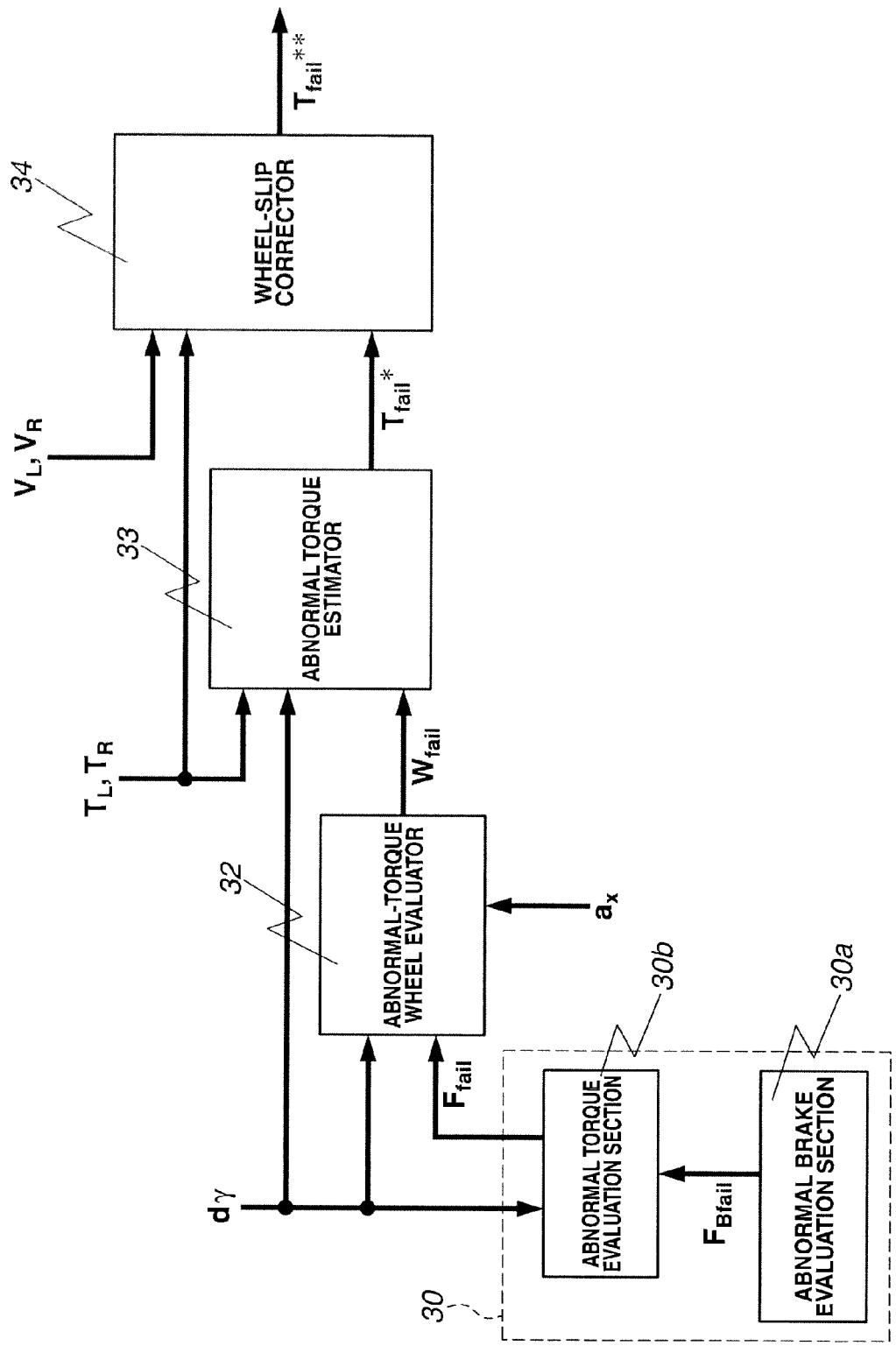
FIG. 14 is a control block diagram illustrating an abnormal motor torque estimator incorporated in the abnormal torque evaluation apparatus of the second embodiment for the electrically driven vehicle.

First, the system configuration is hereunder described. FIG. 14 is the control block diagram illustrating the abnormal motor torque estimator incorporated in the abnormal torque evaluation apparatus of the second embodiment for the electrically driven vehicle.

As shown in FIG. 14, the abnormal motor torque estimator of the second embodiment has an abnormal torque evaluator (an abnormal torque evaluation means) 30, an abnormal-torque wheel evaluator (an abnormal-torque wheel evaluation means) 32, an abnormal torque estimator 33, and a wheel-slip corrector 34. The above-mentioned abnormal torque evaluator 30 has an abnormal brake evaluation section (a brake-abnormality detection section) 30a and an abnormal torque evaluation section 30b.

The above-mentioned abnormal brake evaluation section 30a is configured to detect, based on detection signals from brake sensors (not shown), an abnormality in each of the brakes installed on respective wheels of the electrically driven vehicle 1, namely, front-left and front-right road wheels and left and right driving wheels 2L, 2R, and also configured to output an abnormal-brake evaluation flag $F_{Bfail}$, given by the following expression (20).

$$F_{Bfail} = \begin{cases} 0 & \text{(brakes unfailed)} \\ 1 & \text{(brakes failed)} \end{cases} \quad (20)$$

where $F_{Bfail}=0$ means that there are no abnormalities in the brakes of all road wheels (that is, all brakes in their unfailed states), whereas $F_{fail}=1$ means that there is an abnormality in the brake of at least one road wheel.

The above-mentioned abnormal torque evaluation section 30b is configured to evaluate, based on the yaw jerk dγ [rad/s²] inputted into the abnormal motor torque estimator, the pre-stored abnormality-evaluation threshold value dγ$_{th}$ [rad/s²], and the abnormal-brake evaluation flag $F_{Bfail}$ calculated by the abnormal brake evaluation section 30a, the presence or absence of the occurrence of abnormal motor torque, and also configured to output an abnormal-torque evaluation flag $F_{fail}$, given by the following expression (21).

$$F_{fail} = \begin{cases} 0 & (|d\gamma| < d\gamma_{th}) \\ 1 & (|d\gamma| \geq d\gamma_{th} \text{ AND } F_{Bfail} \neq 1) \end{cases} \quad (21)$$

where $F_{fail}=0$ means a normality, whereas $F_{fail}=1$ means an abnormality. Concretely, when the yaw jerk dγ [rad/s²] does not exceed the abnormality-evaluation threshold value dγ$_{th}$ [rad/s²], it is determined that any abnormality in motor torque does not occur. Conversely when the yaw jerk dγ [rad/s²] exceeds the abnormality-evaluation threshold value dγ$_{th}$ [rad/s²] under the particular condition where there are no abnormalities in the brakes of all road wheels, it is determined that an abnormality in motor torque, which torque is used to drive either the left driving wheel 2L or the right driving wheel 2R, occurs. By the way, the abnormality-evaluation threshold value dγ$_{th}$ [rad/s²] is set to 0.9 [rad/s²].

By the way, the other construction, operation, and effects are the same as those described for the first embodiment, and thus detailed description (illustration) for them will be omitted because the above description (illustration) thereon seems to be self-explanatory.

In this manner, the abnormal torque evaluator 30 of the second embodiment is configured to evaluate the presence or absence of the occurrence of abnormal motor torque when there are no abnormalities in the brakes. Hence, it is possible to evaluate the presence or absence of the occurrence of abnormal motor torque regardless of abnormalities in the brakes, thus enhancing the accuracy of evaluation.

Details of the effects are hereunder described. The abnormal torque evaluation apparatus of the second embodiment for the electrically driven vehicle can provide the following effect in addition to the previously-described effects (1) to (8).

(9) The above-mentioned abnormal torque evaluation means (the abnormal torque evaluator) 30 includes a brake-abnormality detection section (an abnormal brake evaluator) 30a for detecting an abnormality in each of brakes of the electrically driven vehicle 1. The abnormal torque evaluation means 30 is configured to evaluate whether the abnormal motor torque is being generated, when there is no detection of abnormalities in the brakes. Hence, it is possible to evaluate the presence or absence of the occurrence of abnormal motor torque regardless of abnormalities in the brakes, thus enhancing the accuracy of evaluation.

While the foregoing is a description of the abnormal torque evaluation apparatus for the electrically driven vehicle of the first and second embodiments carried out the invention, it will be understood that the invention is not limited to the particular embodiments shown and described herein, but that various changes and modifications may be made without departing from the scope or spirit of this invention.

For instance, in determining the sign of yaw jerk dγ [rad/s²] by the expression (2), the yaw jerk dγ [rad/s²] may be filtered out in advance by means of a low-pass filter or the like, sufficiently taking into account the influence of noise. In such a case, by setting its cutoff frequency to a frequency of 25 Hz or more, it is possible to cut off or reduce high-frequency noise that left and right driving wheels 2L, 2R do not respond, thus enhancing the accuracy of evaluation.

Also, in determining the sign of longitudinal acceleration $a_x$ [G] by the expression (7), the resistance-corrected longitudinal acceleration $a_x$** [G] may be filtered out in advance by means of a low-pass filter or the like, sufficiently taking into account the influence of noise. In such a case, by setting its cutoff frequency to a frequency of 25 Hz or more, it is possible to cut off or reduce high-frequency noise that left and right driving wheels 2L, 2R do not respond, thus enhancing the accuracy of evaluation.

By the way, in the first embodiment, the gradient detection section 22b is configured to detect or derive the longitudinal gradient θ [rad] for example by means of the inclination sensor or the like. In lieu thereof, the electrically driven vehicle 1 is equipped with a vertical acceleration sensor as well as a longitudinal acceleration sensor. The longitudinal gradient θ [rad] may be calculated based on signal values from these sensors.

Furthermore, in the first embodiment, in calculating the vehicle speed V [m/s] by the expression (3), left and right wheel speeds $V_L, V_R$ [m/s] of the driving wheels are used. The way to calculate is not limited to this. For instance, wheel speed sensors may be installed on the road wheels (in the shown embodiment, front-left and front-right road wheels) except the driving wheels. Vehicle speed V [m/s] may be calculated by the use of rotational speeds, detected by these wheel speed sensors on the road wheels except the driving wheels. This eliminates the influence of a wheel slip of the driving wheel, which slip may occur due to abnormal motor torque. Thus, it is possible to enhance the accuracy of calculation for vehicle speed V [m/s].

The abnormal torque evaluation apparatus of the first embodiment is applied to or exemplified in the electrically driven vehicle 1 that rear-left and rear-right road wheels correspond to the driving wheels. In lieu thereof, the abnormal torque evaluation apparatus of the invention may be applied to en electrically driven vehicle that front-left and front-right road wheels correspond to the driving wheels or an electrically driven vehicle in which four road wheels all correspond to the driving wheels. Instead of using in-wheel motors as left and right drive motors 3L, 3R, another type of motors, configured to independently drive left and right driving wheels, may be used. Furthermore, the electrically driven vehicle 1 may be a hybrid vehicle, configured to use both an internal combustion engine and an electric motor as a power source, or a fuel-cell vehicle. Briefly speaking, the abnormal torque evaluation apparatus of the invention for the electrically driven vehicle can be applied to any type of electrically driven vehicle that independently drive left and right driving wheels of at least one of a front road wheel pair and a rear road wheel pair by means of electric motors configured to be driven responsively to respective torque commands.

The invention claimed is:

1. An abnormal torque evaluation apparatus for an electrically driven vehicle that independently drives left and right driving wheels with electric motors and that drives the electric motors responsively to respective torque commands, comprising:
   means for detecting a yaw jerk corresponding to a yaw acceleration exerted on the electrically driven vehicle;
   means for detecting a longitudinal acceleration exerted on the electrically driven vehicle in a longitudinal direction;
   means for evaluating abnormal motor torque to determine whether an abnormal motor torque is being generated at the electric motors; and
   means for evaluating an abnormal torque wheel driven by the abnormal motor torque,
   wherein the means for evaluating abnormal motor torque evaluates, based on the yaw jerk detected in a specified time domain from a time immediately after the yaw jerk has occurred to a time when the yaw jerk becomes a maximum value, whether the abnormal motor torque is being generated at the electric motors, and
   wherein the means for evaluating the abnormal torque wheel evaluates, based on the longitudinal acceleration and the yaw jerk detected in the specified time domain, the abnormal torque wheel.

2. The abnormal torque evaluation apparatus for the electrically driven vehicle as claimed in claim 1, wherein:
   the means for evaluating abnormal motor torque determines that the abnormal motor torque is being generated, when the yaw jerk detected in the specified time domain exceeds a threshold value.

3. The abnormal torque evaluation apparatus for the electrically driven vehicle as claimed in claim 1, wherein:
   the means for evaluating the abnormal torque wheel comprises:
      a gradient detection section for detecting a gradient of a road, on which the electrically driven vehicle is running;
      a vehicle speed detection section for detecting a vehicle-body speed of the electrically driven vehicle; and
      a running-resistance correction section for calculating, based on the gradient and the vehicle-body speed, a running resistance acting on the electrically driven vehicle, and for correcting the longitudinal acceleration by the running resistance.

4. The abnormal torque evaluation apparatus for the electrically driven vehicle as claimed in claim 1, wherein:
   the means for evaluating abnormal motor torque comprises a brake-abnormality detection section for detecting a brake abnormality in a brake of the electrically driven vehicle; and
   the means for evaluating abnormal torque evaluates whether the abnormal motor torque is being generated, when the brake abnormality is undetected.

5. The abnormal torque evaluation apparatus for the electrically driven vehicle as claimed in claim 1, further comprising:
   means for estimating an abnormal motor torque value of the electric motors, comprising:
      an abnormal torque wheel evaluator for evaluating an abnormal torque wheel driven at the abnormal motor torque value; and
      an abnormal torque estimator for estimating the abnormal motor torque value based on the yaw jerk detected in the specified time domain, an abnormal torque wheel evaluation value determined by the abnormal torque wheel evaluator, and the torque commands.

6. The abnormal torque evaluation apparatus for the electrically driven vehicle as claimed in claim 5, wherein:
   the abnormal torque estimator is configured to estimate the abnormal motor torque value based on the maximum value of the yaw jerk.

7. The abnormal torque evaluation apparatus for the electrically driven vehicle as claimed in claim 5, wherein:
   the abnormal torque estimator comprises a tire response correction section for correcting the abnormal motor torque value depending on a response lag in occurrences of longitudinal forces of the driving wheels.

8. The abnormal torque evaluation apparatus for the electrically driven vehicle as claimed in claim 5, further comprising:
   means for detecting respective wheel speeds of the driving wheels,
   wherein the means for estimating abnormal motor torque comprises:
      a wheel-slip corrector for correcting the abnormal motor torque value depending on a slipping condition of the abnormal torque wheel, which slipping condition is derived from the wheel speeds.

9. An abnormal torque evaluation apparatus for an electrically driven vehicle that independently drives left and right driving wheels with electric motors and that drives the electric motors responsively to respective torque commands, comprising:
   a yaw jerk detector configured to detect a yaw jerk corresponding to a yaw acceleration exerted on the electrically driven vehicle;

a longitudinal acceleration detector configured to detect a longitudinal acceleration exerted on the electrically driven vehicle in a longitudinal direction;

an abnormal torque evaluator configured to evaluate whether an abnormal motor torque is being generated at the electric motors; and an abnormal torque wheel evaluator configured to evaluate an abnormal torque wheel driven by the abnormal motor torque, wherein the abnormal torque evaluator is configured to evaluate, based on the yaw jerk detected in a specified time domain from a time immediately after the yaw jerk has occurred to a time when the yaw jerk becomes a maximum value, whether the abnormal motor torque is being generated at the electric motors, and wherein the abnormal torque wheel evaluator is configured to evaluate, based on the longitudinal acceleration and the yaw jerk detected in the specified time domain, the abnormal torque wheel.

10. The abnormal torque evaluation apparatus for the electrically driven vehicle as claimed in claim 9, wherein:

the abnormal torque evaluator is configured to evaluate that the abnormal motor torque is being generated, when the yaw jerk detected in the specified time domain exceeds a threshold value.

11. The abnormal torque evaluation apparatus for the electrically driven vehicle as claimed in claim 9, wherein:

the abnormal torque wheel evaluator comprises:

a gradient detection section configured to detect a gradient of a road, on which the electrically driven vehicle is running;

a vehicle speed detection section configured to detect a vehicle-body speed of the electrically driven vehicle; and a running-resistance correction section configured to calculate, based on the gradient and the vehicle-body speed, a running resistance acting on the electrically driven vehicle, and to correct the longitudinal acceleration based on the running resistance.

12. The abnormal torque evaluation apparatus for the electrically driven vehicle as claimed in claim 9, wherein:

the abnormal torque evaluator comprises a brake-abnormality detection section configured to detect a brake abnormality in a brake of the electrically driven vehicle; and the abnormal torque evaluator is configured to evaluate whether the abnormal motor torque is being generated, when the brake abnormality is undetected.

13. The abnormal torque evaluation apparatus for the electrically driven vehicle as claimed in claim 9, further comprising:

an abnormal motor torque estimator configured to estimate an abnormal motor torque value of the electric motors, wherein the abnormal motor torque estimator comprises:

an abnormal torque wheel evaluator configured to evaluate an abnormal torque wheel driven at the abnormal motor torque value; and an abnormal torque estimator configured to estimate the abnormal motor torque value based on the yaw jerk detected in the specified time domain, an abnormal torque wheel evaluation value determined by the abnormal torque wheel evaluator, and the torque commands.

14. The abnormal torque evaluation apparatus for the electrically driven vehicle as claimed in claim 13, wherein:

the abnormal motor torque estimator is configured to estimate the abnormal motor torque value based on the maximum value of the yaw jerk.

15. The abnormal torque evaluation apparatus for the electrically driven vehicle as claimed in claim 13, wherein:

the abnormal motor torque estimator comprises a tire response correction section configured to correct the abnormal motor torque value depending on a response lag in occurrences of longitudinal forces of the driving wheels.

16. The abnormal torque evaluation apparatus for the electrically driven vehicle as claimed in claim 13, further comprising:

wheel speed detectors configured to detect respective wheel speeds of the driving wheels, wherein the abnormal motor torque estimator comprises:

a wheel-slip corrector configured to correct the abnormal motor torque value depending on a slipping condition of the abnormal torque wheel, which slipping condition is derived from the wheel speeds.

\* \* \* \* \*